(12) United States Patent
Kim et al.

(10) Patent No.: US 10,009,965 B2
(45) Date of Patent: Jun. 26, 2018

(54) GAS DETECTION APPARATUS, COOKING APPARATUS, AND METHOD OF CONTROLLING THE APPARATUSES

(71) Applicant: SAMSUNG ELECTRONICS CO., LTD., Suwon-si, Gyeonggi-do (KR)

(72) Inventors: Hyun Sook Kim, Hwaseong-si (KR); Boo Keun Yoon, Yongin-si (KR); Sang Hak Kim, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 98 days.

(21) Appl. No.: 14/957,956

(22) Filed: Dec. 3, 2015

(65) Prior Publication Data
US 2016/0213033 A1 Jul. 28, 2016

(30) Foreign Application Priority Data

Jan. 28, 2015 (KR) .......................... 10-2015-0013894
Feb. 27, 2015 (KR) .......................... 10-2015-0028010

(51) Int. Cl.
*A23L 7/00* (2016.01)
*H05B 6/80* (2006.01)
(Continued)

(52) U.S. Cl.
CPC .............. *H05B 6/80* (2013.01); *A23L 5/10* (2016.08); *A23L 5/15* (2016.08); *A47J 27/62* (2013.01); *H05B 6/6435* (2013.01); *H05B 6/6458* (2013.01); *A47J 36/32* (2013.01); *F24C 7/08* (2013.01)

(58) Field of Classification Search
CPC ... A47J 27/62; A47J 36/32; F24C 7/08; A23L 5/10
USPC ..... 99/325, 326, 327, 328, 329 R, 331, 332, 99/333, 337
See application file for complete search history.

(56) References Cited

U.S. PATENT DOCUMENTS 3,329,529 A 7/1967 Lamar
3,498,771 A 3/1970 Bird et al.
(Continued)

FOREIGN PATENT DOCUMENTS

EP 0 615 400 9/1994
JP 62-123226 6/1987
(Continued)

OTHER PUBLICATIONS

International Search Report dated Apr. 29, 2016 in International Patent Application No. PCT/KR2015/014142.
(Continued)

*Primary Examiner* — Reginald L Alexander
(74) *Attorney, Agent, or Firm* — Staas & Halsey LLP

(57) ABSTRACT

Disclosed herein is a cooking apparatus including a heating unit configured to heat an ingredient contained in a cooking chamber, a gas sensor configured to detect a gas inside the cooking chamber, a communication unit configured to communicate with an external apparatus, and a control unit configured to determine a cooking progress state of the ingredient based on the type and concentration of the gas detected by the gas sensor and to transmit information on the cooking progress state to the external apparatus through the communication unit to inform a user of the cooking progress state.

12 Claims, 30 Drawing Sheets

(51) Int. Cl.
  *H05B 6/64* (2006.01)
  *A47J 27/62* (2006.01)
  *A23L 5/10* (2016.01)
  *F24C 7/08* (2006.01)
  *A47J 36/32* (2006.01)

(56) References Cited

U.S. PATENT DOCUMENTS

| | | | |
|---|---|---|---|
| 3,510,758 | A | 5/1970 | Huggett |
| 3,523,405 | A | 8/1970 | Knapp |
| 3,679,908 | A | 7/1972 | Mazza |
| 3,753,003 | A | 8/1973 | Mazza |
| 3,827,869 | A | 8/1974 | Bonin |
| 3,866,616 | A | 2/1975 | Purdy et al. |
| 4,088,863 | A | 5/1978 | Jellies |
| 4,262,662 | A | 4/1981 | Allinson |
| 4,383,158 | A | 5/1983 | Niwa |
| 4,406,945 | A | 9/1983 | Ueda et al. |
| 4,442,344 | A | 4/1984 | Yasuda |
| 4,481,394 | A | 11/1984 | Tanabe |
| 4,488,026 | A | 12/1984 | Tanabe |
| 4,496,817 | A | 1/1985 | Smith |
| 4,606,650 | A | 8/1986 | Harris |
| 4,791,263 | A | 12/1988 | Groeschel, Jr. |
| 4,794,323 | A | 12/1988 | Zhou et al. |
| 4,814,570 | A | 3/1989 | Takizaki |
| 4,884,626 | A | 12/1989 | Filipowski |
| 4,926,837 | A | 5/1990 | Parker et al. |
| 5,166,487 | A | 11/1992 | Hurley et al. |
| 5,369,253 | A * | 11/1994 | Kuwata ............... F24C 7/087 |
| | | | 219/400 |
| 5,436,433 | A | 7/1995 | Kim et al. |
| 5,459,303 | A | 10/1995 | Kwon |
| 5,464,967 | A | 11/1995 | Gong |
| 5,468,940 | A | 11/1995 | Kang |
| 5,558,797 | A | 9/1996 | Takagi |
| 6,017,147 | A | 1/2000 | Gibson, Jr. |
| 6,396,031 | B1 | 5/2002 | Forrester |
| 6,441,354 | B1 | 8/2002 | Seghatol et al. |
| 6,455,317 | B1 | 9/2002 | Lautenschlager |
| 6,462,319 | B1 | 10/2002 | Uy et al. |
| 6,587,739 | B1 * | 7/2003 | Abrams .............. G05B 15/02 |
| | | | 340/12.32 |
| 7,133,739 | B2 * | 11/2006 | Williamson ..... H04N 21/25891 |
| | | | 219/414 |
| 7,923,664 | B2 * | 4/2011 | Kruempelmann .. F24C 15/2014 |
| | | | 165/200 |
| 7,946,220 | B2 * | 5/2011 | Ose ..................... F24C 15/327 |
| | | | 219/395 |
| 8,849,430 | B2 * | 9/2014 | Elston, III ............ G04R 20/26 |
| | | | 219/483 |
| 9,486,099 | B2 * | 11/2016 | Valance ................ A47J 27/00 |
| 2003/0029864 | A1 | 2/2003 | Shon |
| 2003/0031766 | A1 | 2/2003 | Lee et al. |
| 2003/0107385 | A1 | 6/2003 | Shon et al. |
| 2003/0192885 | A1 | 10/2003 | Shon et al. |
| 2004/0016754 | A1 | 1/2004 | Yang |
| 2004/0027773 | A1 | 2/2004 | Alton |
| 2004/0040955 | A1 | 3/2004 | Yang |
| 2005/0061799 | A1 | 3/2005 | Kruempelmann et al. |
| 2005/0062552 | A1 | 3/2005 | Deng et al. |
| 2006/0043087 | A1 | 3/2006 | Gagas et al. |
| 2006/0289506 | A1 | 12/2006 | Shon et al. |
| 2007/0158338 | A1 | 7/2007 | Wang |
| 2007/0219430 | A1 | 9/2007 | Moore |
| 2007/0241099 | A1 | 10/2007 | Sanna et al. |
| 2008/0264269 | A1 * | 10/2008 | Sterzel .................... F24C 7/08 |
| | | | 99/331 |
| 2008/0296284 | A1 | 12/2008 | McFadden et al. |
| 2009/0009287 | A1 | 1/2009 | Falcioni et al. |
| 2009/0038369 | A1 | 2/2009 | Vondras |
| 2010/0286801 | A1 | 11/2010 | Yum et al. |
| 2011/0114634 | A1 | 5/2011 | Nevarez |
| 2012/0012010 | A1 | 1/2012 | Baraille et al. |
| 2012/0012577 | A1 | 1/2012 | Jussel et al. |
| 2012/0083198 | A1 | 4/2012 | Sinur et al. |
| 2013/0201316 | A1 | 8/2013 | Binder et al. |
| 2014/0020567 | A1 | 1/2014 | Lin |
| 2014/0028445 | A1 | 1/2014 | Wild |
| 2014/0044841 | A1 | 2/2014 | Luckhardt et al. |
| 2014/0094136 | A1 | 4/2014 | Huang |

FOREIGN PATENT DOCUMENTS

| | | |
|---|---|---|
| KR | 10-2009-0064497 | 6/2009 |
| KR | 10-2012-0006411 | 1/2012 |

OTHER PUBLICATIONS

European Office Action dated Nov. 21, 2017 in corresponding European Patent Application No. 15 880 298.3.

European Search Report dated Oct. 20, 2017 in corresponding European Patent Application No. 15 880 298.3.

* cited by examiner

SULFUR COMPOUNDS — 0.03
ORGANIC COMPOUNDS — 0.03
PPM

GAS DETECTION APPARATUS, COOKING APPARATUS, AND METHOD OF CONTROLLING THE APPARATUSES

CROSS-REFERENCE TO RELATED APPLICATIONS

This application claims the benefit of Korean Patent Application No. 10-2015-0013894 and 10-2015-0028010, filed on Jan. 28, 2015 and Feb. 27, 2015, respectively, in the Korean Intellectual Property Office, the disclosure of which is incorporated herein by reference.

BACKGROUND

1. Field

Embodiments of the disclosure relate to a gas detection apparatus, a cooking apparatus, and a method of controlling the apparatuses, and more particularly, to a gas detection apparatus including a gas sensor, a cooking apparatus, and a method of controlling the apparatuses.

2. Description of the Related Art

Cooking apparatuses are apparatuses for heating an ingredient contained in a cooking chamber to cook the ingredient.

Cooking apparatuses may be divided into gas ovens which heat an ingredient by burning gas, electric ovens which convert electric energy into heat energy to heat an ingredient, microwave ovens which heat an ingredient by radiating microwaves onto the ingredient, gas ranges which heat a container which contains an ingredient by burning gas, and induction ranges which heat a container which contains an ingredient by generating a magnetic field.

To use conventional cooking apparatuses, it is inconvenient for users to set a cooking method, a cooking temperature, and a cooking time.

SUMMARY

Therefore, it is an aspect of the disclosure to provide a cooking apparatus which detects a gas generated from an ingredient and determines a cooking mode, a cooking temperature, and a cooking time optimal for the ingredient based on the detected gas.

It is another aspect of the disclosure to provide a cooking apparatus which detects a gas generated from an ingredient, determines a cooking progress state of the ingredient based on the detected gas, and transmits information on the cooking progress state to electronic apparatuses such as a mobile terminal, an image display apparatus, and a refrigerator to inform a user of the cooking progress state.

It is still another aspect of the disclosure to provide a gas detection apparatus which detects a gas generated from an ingredient, determines a cooking progress state of the ingredient based on the detected gas, and transmits information on the cooking progress state to electronic apparatuses such as a mobile terminal, an image display apparatus, and a refrigerator to inform a user of the cooking progress state.

Additional aspects of the disclosure will be set forth in part in the description which follows and, in part, will be obvious from the description, or may be learned by practice of the disclosure.

In accordance with one aspect of the disclosure, a cooking apparatus includes a heating unit configured to heat an ingredient contained in a cooking chamber, a gas sensor configured to detect a gas inside the cooking chamber, a communication unit configured to communicate with an external apparatus, and a control unit configured to determine a cooking progress state of the ingredient based on at least one of a type and concentration of the gas detected by the gas sensor and to transmit information on the cooking progress state to the external apparatus through the communication unit to inform a user of the cooking progress state.

The control unit may determine a type of the ingredient based on the type and concentration of the gas detected by the gas sensor.

The control unit may determine at least one of a cooking mode, a cooking time, and a cooking temperature according to the type of the ingredient.

The control unit may transmit information on a food item for a next meal according to the determined type of the ingredient to the external apparatus through the communication unit to inform the user of the food item for the next meal.

The control unit may transmit information on an additional food item according to the determined type of the ingredient to the external apparatus through the communication unit to inform the user of the additional food item.

The control units may transmit ingredient information including the determined type of the ingredient to an external dishwasher to allow the external dishwasher to control a washing program based on the determined type of the ingredient.

The control unit may determine whether cooking of the ingredient is completed based on the type and concentration of the gas detected by the gas sensor and may transmit a cooking completion display request to the external apparatus to inform the user that the cooking is completed when the cooking is completed.

The control unit may determine a cooking completion time of the ingredient based on the type and concentration of the gas detected by the gas sensor and may transmit information on the cooking completion time to the external apparatus through the communication unit to inform the user of the cooking completion time.

The control unit may transmit a ventilation request message to an external air conditioner through the communication unit when the concentration of the gas detected by the gas sensor is higher than a reference value.

In accordance with another aspect of the disclosure, a method of controlling a cooking apparatus includes heating an ingredient contained in a cooking chamber according to a control command of a user, detecting a gas inside the cooking chamber, determining a cooking progress state of the ingredient based on at least one of a type and concentration of the detected gas, and transmitting information on the cooking progress state to an external apparatus to inform the user of the cooking progress state.

The method may further include determining a type of the ingredient based on the type and concentration of the detected gas.

The method may further include determining at least one of a cooking mode, a cooking time, and a cooking temperature according to the type of the ingredient.

The method may further include transmitting information on a food item for a next meal according to the determined type of the ingredient to the external apparatus to inform the user of the food item for the next meal.

The method may further include transmitting information on an additional food item according to the determined type of the ingredient to the external apparatus to inform the user of the additional food item.

The method may further include transmitting ingredient information including the determined type of the ingredient to an external dishwasher to allow the external dishwasher to control a washing program based on the determined type of the ingredient.

The transmitting of the information on the cooking progress state to the external apparatus may include determining whether cooking of the ingredient is completed based on the type and concentration of the detected gas and transmitting a cooking completion display request to the external apparatus to inform the user that the cooking is completed when the cooking is completed.

The transmitting of the information on the cooking progress state to the external apparatus may include determining a cooking completion time of the ingredient based on the type and concentration of the detected gas and transmitting information on the cooking completion time to the external apparatus to inform the user of the cooking completion time.

The method may further include transmitting a ventilation request message to an external air conditioner when the concentration of the detected gas is higher than a reference value.

In accordance with still another aspect of the disclosure, a gas detection apparatus includes a gas sensor configured to detect a gas inside the cooking chamber, a communication unit configured to communicate with an external apparatus, and a control unit configured to determine a cooking progress state of the ingredient based on at least one of a type and concentration of the gas detected by the gas sensor and to transmit information on the cooking progress state to the external apparatus through the communication unit to inform a user of the cooking progress state.

The control unit may determine a type of the ingredient based on the type and concentration of the gas detected by the gas sensor.

The control unit may determine at least one of a cooking mode, a cooking time, and a cooking temperature according to the type of the ingredient.

In accordance with yet another aspect of the disclosure, a cooking apparatus detects a gas generated from an ingredient, determines a cooking progress state of the ingredient based on the detected gas, and transmits information on the cooking progress state to electronic apparatuses such as a mobile terminal, an image display apparatus, and a refrigerator to inform a user of the cooking progress state.

In accordance with yet another aspect of the disclosure, a gas detection apparatus detects a gas generated from an ingredient, determines a cooking progress state of the ingredient based on the detected gas, and transmits information on the cooking progress state to electronic apparatuses such as a mobile terminal, an image display apparatus, and a refrigerator to inform a user of the cooking progress state.

In accordance with another aspect of the disclosure, a cooking apparatus may include a heater to heat food placed on or within the cooking apparatus, a sensor unit including a gas sensor to sense gas generated by the food placed on or within the cooking apparatus, and a control unit to determine a cooking parameter of the food based on input from the sensor unit.

The gas sensor may be configured to sense a type or concentration of the gas generated by the food. The cooking parameter may include at least one of a degree of progress in a cooking operation of the food, a type of ingredient of the food, or a number of calories in the ingredient.

The cooking apparatus may also include a communication unit to transmit information on the cooking parameter to an external apparatus to inform a user of the cooking parameter.

In accordance with yet another aspect of the disclosure, a method of cooking with a cooking apparatus may include heating food placed within a cooking chamber of the cooking apparatus, sensing, using a gas sensor, gas generated by the food placed within the cooking chamber, and determining, by way of a processor, a cooking parameter of the food based on the sensing of the gas generated by the food.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
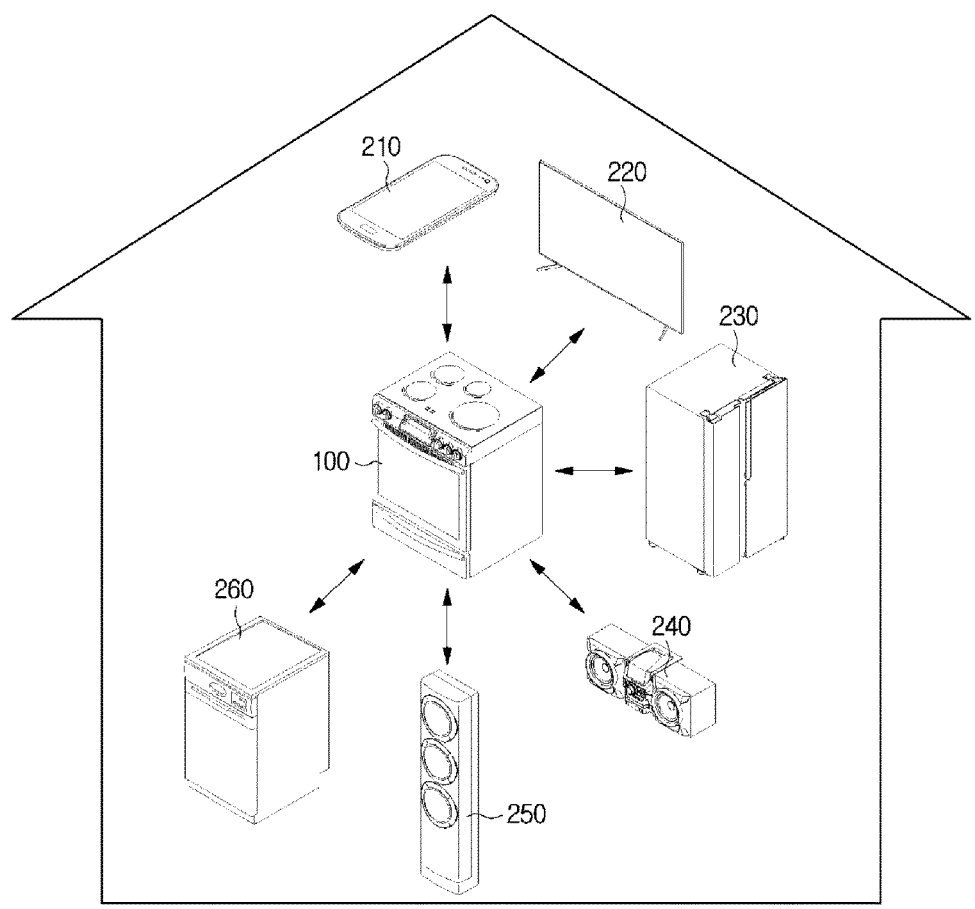
FIG. 1 is a schematic diagram illustrating an operation of a cooking apparatus according to one embodiment of the disclosure.

Reference will now be made in detail to the embodiments of the disclosure, examples of which are illustrated in the accompanying drawings, wherein like reference numerals refer to like elements throughout.

Hereinafter, one embodiment of the disclosure will be described in detail with reference to the attached drawings.

FIG. 1 is a schematic diagram illustrating an operation of a cooking apparatus 100 according to one embodiment of the disclosure.

The cooking apparatus 100 is an apparatus which heats an ingredient to cook the ingredient and may be provided in various forms. For example, the cooking apparatus 100 may be provided as one of a gas oven which heats an ingredient by burning gas, an electric oven which heats an ingredient by converting electric energy into heat energy, and a microwave oven which heats an ingredient by radiating microwaves onto the ingredient.

Also, the cooking apparatus 100 may cook an ingredient in various ways according to a selection of a user. For example, the cooking apparatus 100 may supply heated air into a cooking chamber in which the ingredient is provided. Generally, cooking an ingredient using heated air is referred to as "baking." Also, the cooking apparatus 100 may directly emit radiant heat onto the ingredient. Generally, emitting radiant heat onto the ingredient to cook the ingredient is referred to as "grilling" or "broiling." Also, the cooking apparatus 100 may radiate microwaves into the cooking chamber in which the ingredient is provided or may supply heated steam into the cooking chamber in which the ingredient is provided.

The cooking apparatus 100 may provide the user with a plurality of cooking modes corresponding to the various methods. For example, the cooking apparatus 100 may provide a bake mode in which heated air is supplied into the cooking chamber, a broil mode in which radiant heat is directly emitted onto an ingredient, a microwave mode in which microwaves are supplied into the cooking chamber, and a steam mode in which heated steam is supplied into the cooking chamber.

Here, the cooking apparatus 100 may not always provide all of the cooking modes. For example, the cooking apparatus 100 may provide only the bake mode and the broil mode or may provide only the microwave mode and the steam mode. Also, as shown in FIG. 1, the cooking apparatus 100 may communicate with various electronic apparatuses such as a mobile terminal 210, an image display apparatus 220, a refrigerator 230, an audio output apparatus 240, an air conditioner 250, and a dishwasher 260. Additionally, the cooking apparatus 100 may communicate with a server (not shown). Here, the cooking apparatus 100 may directly communicate with the mobile terminal 210, the image display apparatus 220, the refrigerator 230, the audio output apparatus 240, the air conditioner 250, and the dishwasher 260 or may communicate with the mobile terminal 210, the image display apparatus 220, the refrigerator 230, the audio output apparatus 240, the air conditioner 250, and the dishwasher 260 through a network such as the Internet, an intranet, etc.

Specifically, the cooking apparatus 100 may detect a gas generated from the ingredient and may control operations of the mobile terminal 210, the image display apparatus 220, the refrigerator 230, the audio output apparatus 240, the air conditioner 250, and the dishwasher 260 based on a type and concentration of the detected gas through communication.

For example, the cooking apparatus 100 may detect the gas generated from the ingredient and may determine a degree of cooking the ingredient depending on the type or the concentration of the detected gas, or both. Also, the cooking apparatus 100 may transmit cooking progress information which indicates the degree of cooking the ingredient to the mobile terminal 210, the image display apparatus 220, the refrigerator 230, the audio output apparatus 240, the air conditioner 250, and the dishwasher 260. The mobile terminal 210, the image display apparatus 220, the refrigerator 230, the audio output apparatus 240, the air conditioner 250, and the dishwasher 260, which receive the cooking progress information, may provide the user with the cooking progress information through various methods using images, audio, vibration, and oscillation.

The cooking progress information, which indicates the degree of cooking the ingredient, may be changed into various types of information to be provided to the user. For example, the cooking progress information may be provided to the user as information on a cooking completion time according to a degree of progress in cooking or as information on whether the ingredient is overcooked or undercooked depending on the degree of progress in cooking.

Also, the cooking apparatus 100 may determine the ingredient according to the type and concentration of the detected gas and may determine an optimal cooking mode, cooking time, and cooking temperature for the ingredient. Also, the cooking apparatus 100 may transmit cooking-related information which includes the determined cooking mode, cooking time, and cooking temperature to the mobile terminal 210, the image display apparatus 220, the refrigerator 230, the audio output apparatus 240, the air conditioner 250, and the dishwasher 260 through communication. The mobile terminal 210, the image display apparatus 220, the refrigerator 230, the audio output apparatus 240, the air conditioner 250, and the dishwasher 260, which receive the cooking-related information, may provide the user with the cooking mode, cooking time, and cooking temperature through various methods using images, audio, vibration, and oscillation.

As described above, the cooking apparatus 100 may transmit the cooking progress information to the mobile terminal 210, the image display apparatus 220, the refrigerator 230, the audio output apparatus 240, the air conditioner 250, and the dishwasher 260 through communication and the mobile terminal 210, the image display apparatus 220, the refrigerator 230, the audio output apparatus 240, the air conditioner 250, and the dishwasher 260 may display the cooking progress information, thereby allowing the user to check progress information on cooking performed by the cooking apparatus 100 anywhere and at any time.

Also, the cooking apparatus 100 may provide the user with the optimal cooking mode, cooking time, and cooking temperature for the ingredient, thereby allowing the user to easily cook the ingredient.

Figure 2:
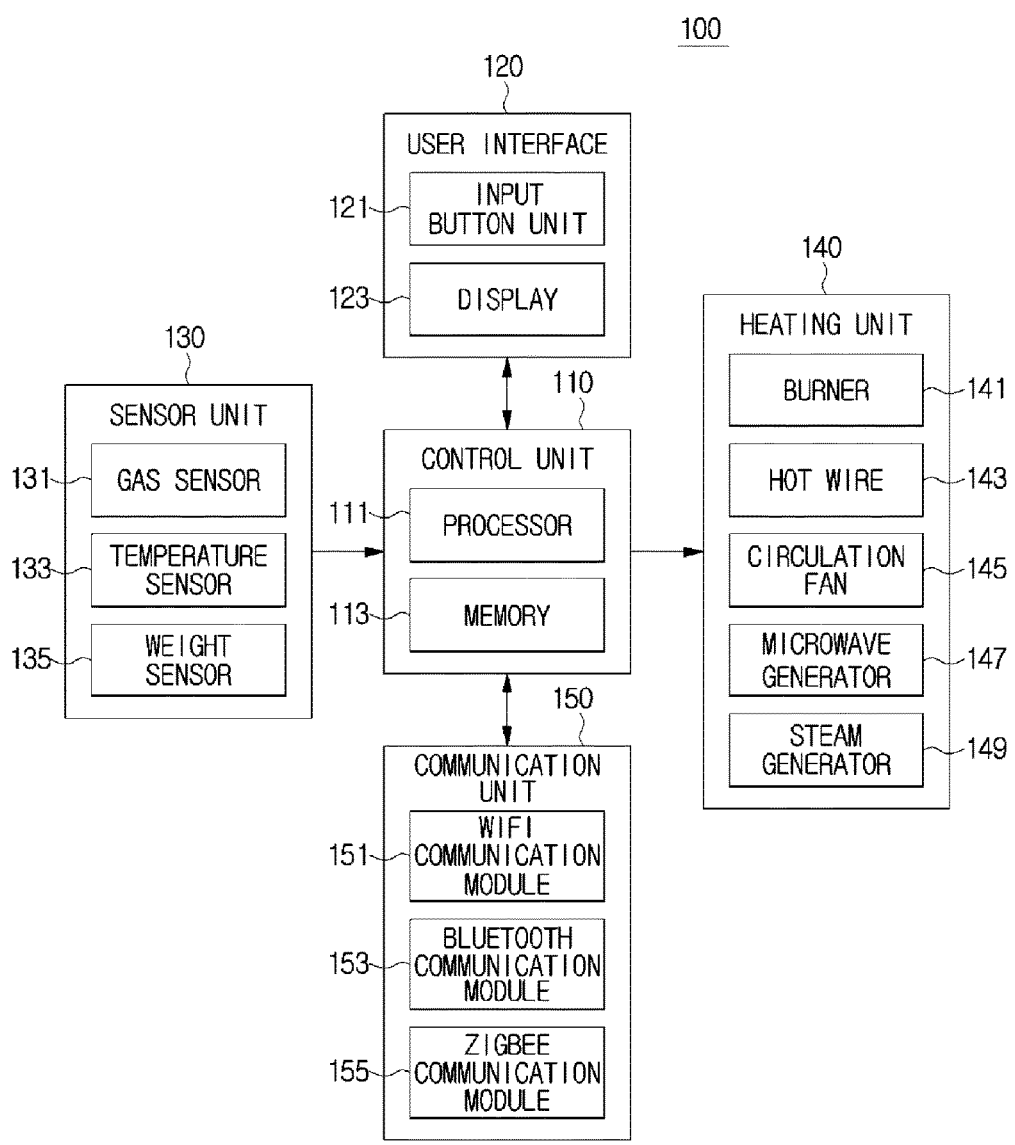
FIG. 2 is a configuration diagram of the cooking apparatus according to one embodiment of the disclosure.
Figure 3:
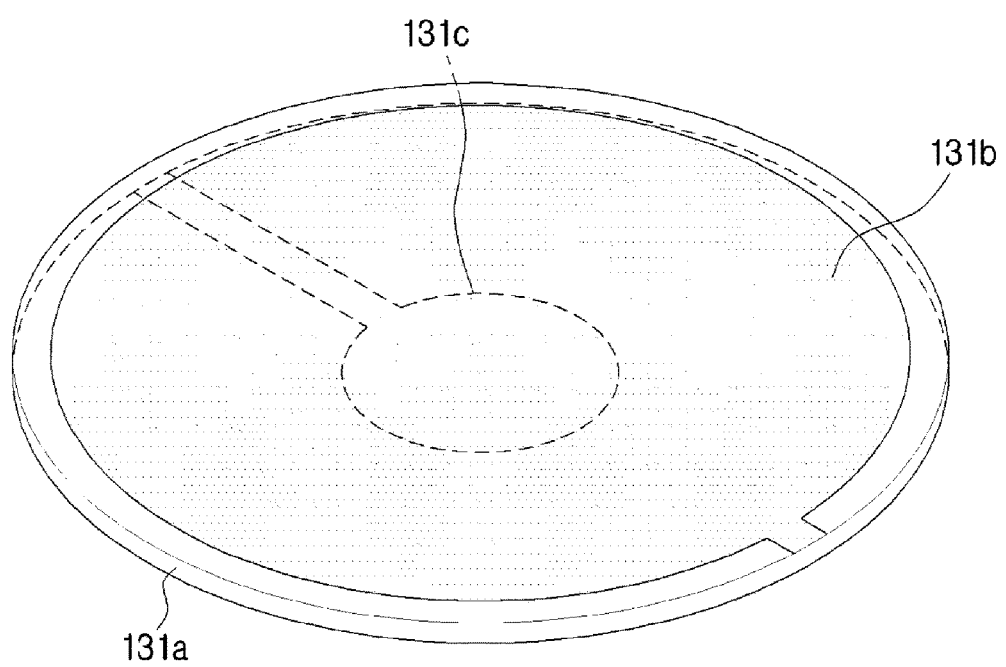
FIG. 3 illustrates an example of a gas sensor included in the cooking apparatus according to one embodiment of the disclosure.
Figure 4:
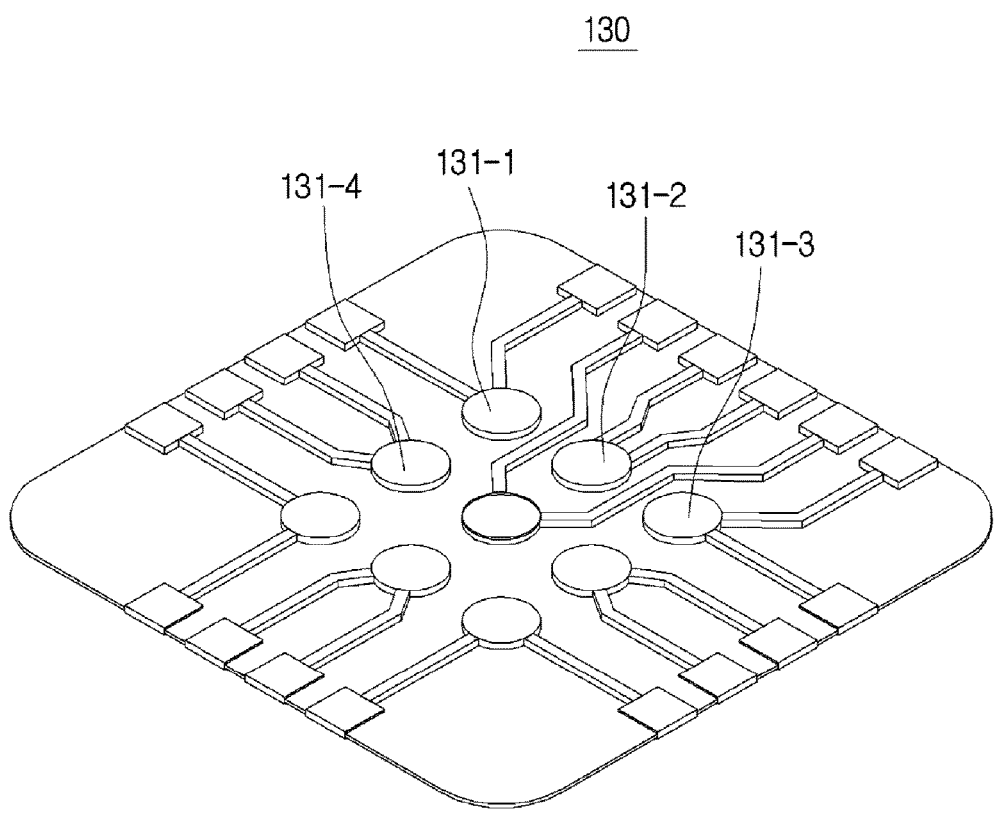
FIG. 4 illustrates another example of the gas sensor included in the cooking apparatus according to one embodiment of the disclosure.

FIG. 2 is a configuration diagram of the cooking apparatus 100 according to one embodiment of the disclosure. FIG. 3 illustrates an example of a gas sensor 131 included in the cooking apparatus 100 according to one embodiment of the disclosure. FIG. 4 illustrates another example of the gas sensor 131 included in the cooking apparatus 100 according to one embodiment of the disclosure.

Referring to FIGS. 2, 3, and 4, the cooking apparatus 100 includes a user interface 120 which interacts with the user, a sensor unit 130 which collects information on the cooking chamber and ingredient, a heating unit 140 which heats the ingredient, a communication unit 150 which communicates with various electronic apparatuses 200, and a control unit 110 which controls the operation of the cooking apparatus 100.

The user interface 120 may include an input button unit 121 and a display 123.

The input button unit 121 receives various setting values related to cooking and a control command related to the cooking apparatus 100 from the user and outputs electric signals corresponding to the setting values and the control command input by the user to the control unit 110.

For example, the input button unit 121 may include a plurality of operation buttons which receive the control command with respect to the cooking apparatus 100 and dials which receive settings for a cooking operation. The cooking apparatus 100 may receive the cooking mode through the operation buttons and may receive the cooking time and the cooking temperature through the dials. The operation buttons described above may employ a push switch, a membrane switch, or a touch pad.

The display 123 may display operation information of the cooking apparatus 100 to the user as visual images depending on a control signal of the control unit 110.

For example, before performing the cooking operation, the cooking apparatus 100 may display a cooking mode selected by the user and a cooking temperature and a cooking time input by the user through the display 123. Also, during the cooking operation, the cooking apparatus 100 may display a cooking mode which is presently performed and an estimated remaining cooking time to the completion of cooking through the display 123.

The display 123 described above may employ one of a light emitting diode (LED), a liquid crystal display (LCD) panel, and an organic LED (OLED) panel.

Also, the user interface 120 may include a touch screen in which an input part and a display part are integrated.

A touch screen panel displays a setting value or a control command to be selectable by the user. When the user selects and touches any one of the setting value and the control command displayed on a display panel, the touch screen panel may detect coordinates of a touch of the user and compare the detected coordinates of the touch with coordinates on which one of the setting value and the control command is displayed, thereby recognizing the setting value or the control command input by the user.

The sensor unit 130 may include the gas sensor 131 which detects a gas inside a cooking chamber (not shown) containing the ingredient, a temperature sensor 133 detecting a temperature inside the cooking chamber, and a weight sensor 135 detecting a weight of the ingredient contained in the cooking chamber.

The gas sensor 131 detects a type and concentration of a gas generated from an ingredient and flowing inside the cooking chamber.

The gas sensor 131 described above may include a semiconductor-type gas sensor which determines the type and concentration of the gas using a change in electrical conductivity occurring when gas particles contact a surface thereof and a quartz crystal microbalance (QCM) which determines the type and concentration of the gas using a piezoelectric effect.

Particularly, the QCM microbalance may determine the concentration of the gas using a resonant frequency of a piezoelectric device. Specifically, when certain gas particles are coupled with a receptor fixed to the QCM, the mass thereof increases, thereby reducing the resonant frequency of the piezoelectric device.

The QCM may determine a type of the gas particle depending on a material coupled with the receptor and may determine the concentration of the gas based on a change in resonant frequency.

Specifically, as shown in FIG. 3, the QCM may include a quartz crystal 131a which vibrates, a first electrode 131b provided on one side of the quartz crystal 131a, and a second electrode 131c provided on the other side of the quartz crystal 131a.

When certain gas particles among gas particles which flow inside the cooking chamber are adsorbed onto the first electrode 131b, a resonant frequency of the quartz crystal 131a is reduced according to an amount of the adsorbed gas particles. The QCM may sense the change in resonant frequency of the quartz crystal 131a through the first electrode 131b and the second electrode 131c. Also, the control unit 110 of the cooking apparatus 100 may determine the concentration of a certain gas base on a change in resonant frequency.

Also, as shown in FIG. 4, the gas sensor 131 may include a plurality of QCMs 131-1, 131-2, 131-3, and 131-4 which include receptors coupled with mutually different gas particles. In this case, the gas sensor 131 may detect concentrations of various types of gases. For example, when a first QCM 131-1 includes a receptor coupled with hydrogen sulfide and a second QCM 131-2 includes a receptor coupled with ethylene, the gas sensor 131 may detect the concentration of hydrogen sulfide using the first QCM 131-1 and may detect the concentration of ethylene using the second QCM 131-2.

As described above, since each QCM includes a receptor coupled with a certain gas particle, the gas sensor 131 may measure the concentration of each of a plurality of gas particles included in the gas. Specifically, the gas sensor 131 may separately detect the concentrations of carbon dioxide ($CO_2$), methane gas, sulfur compounds, ammonia, organic acids, etc. Also, when the gas sensor 131 includes a QCM including a receptor coupled with steam ($H_2O$), the gas sensor 131 may detect humidity.

The gas sensor 131 described above may be installed on one of an upper portion of the inside of the cooking chamber in which the gas flows and an outlet through which air inside the cooking chamber is discharged.

Also, the gas sensor 131 may be separate from the cooking apparatus 100 and may transmit information on the type and concentration of the gas inside the cooking chamber to the cooking apparatus 100 through communication.

The temperature sensor 133 is provided on one side of the cooking chamber and detects a temperature inside the cooking chamber. For example, the temperature sensor 133 may include a thermistor whose resistance varies with temperature.

The weight sensor 135 is provided on a bottom of the cooking chamber and detects a weight of an ingredient. For example, the weight sensor 135 may include a strain gauge whose electrical resistance value varies with a mechanical change.

The heating unit 140 may include a burner 141 which heats the inside of the cooking chamber by burning gas, a hot wire 143 which converts electric energy into heat energy, a circulation fan 145 which circulates air inside the cooking chamber, a microwave generator 147 which radiates microwaves inside the cooking chamber, and a steam generator 149 which emits heated steam into the cooking chamber.

However, the heating unit 140 need not include all of the burner 141, the hot wire 143, the circulation fan 145, the microwave generator 147, and the steam generator 149. Depending on a type of the cooking apparatus 100, the heating unit 140 may include at least one of the burner 141, the hot wire 143, the circulation fan 145, the microwave generator 147, and the steam generator 149.

For example, when the cooking apparatus 100 is a gas oven, the heating unit 140 may include the burner 141. When the cooking apparatus 100 is an electric oven, the heating unit 140 may include the hot wire 143 and the circulation fan 145. Also, when the cooking apparatus 100 is a microwave oven, the heating unit 140 may include the microwave generator 147. When the cooking apparatus 100 is a steam oven, the heating unit 140 may include the steam generator 149.

Also, according to the type of the heating unit 140, the cooking apparatus 100 may provide various cooking modes.

For example, the cooking apparatus 100 may provide one of a grill mode and a broil mode using one of the burner 141 and the hot wire 143 provided in the upper portion of the cooking chamber or may provide a bake mode using one of the burner 141 and the hot wire 143 provided in a lower portion of the cooking chamber.

Also, the cooking apparatus 100 may provide a convection mode using the hot wire 143 and the circulation fan 145 and may provide a steam mode using the steam generator 149.

Also, the cooking apparatus 100 may provide a microwave mode using the microwave generator 147.

The communication unit 150 may include communication modules 151, 153, and 155 which communicate with an external electronic apparatus through various communication standards.

For example, the communication unit 150 may include a wireless fidelity (WiFi) communication module 151 which accesses a local area network (LAN), a Bluetooth communication module 153 which communicates with an external device(s) one by one or one to many, and a Zigbee communication module 155 generally used for a home network.

However, the communication unit 150 need not include all of the WiFi communication module 151, the Bluetooth communication module 153, and the Zigbee communication module 155. The communication unit 150, as necessary, may include at least one of the WiFi communication module 151, the Bluetooth communication module 153, and the Zigbee communication module 155.

The control unit 110 may include a memory 113 which stores a program and data for controlling the cooking apparatus 100 and a processor 111 which processes the data according to the program stored in the memory 113.

The memory 113 may store a control program and control data for controlling the cooking apparatus 100 or may store a setting value and a control command input through the user interface 120, a temperature inside the cooking chamber and a type and concentration of gas detected by the sensor unit 130, and a control signal output by the processor 111.

Particularly, the memory 113 may store ingredient detection data for determining a type of ingredient and a degree of progress in cooking of the ingredient based on the type and concentration of gas particles detected by the gas sensor 131. For example, the ingredient detection data may have the form of a lookup table in which a plurality of gas particles and ingredients corresponding thereto are stored.

Also, the memory 113 may store ingredient nutritional content data which includes nutritional contents according to the type of the ingredient, for example, carbohydrates, proteins, fats, vitamins, minerals, etc., and percentages of the nutritional contents. For example, in the memory 113, information on beef and proteins, zinc, phosphorus, vitamin B, and iron, which are contained in beef, may be stored in relation with each other.

Also, the memory 113 may store cooking data on the ingredient, which includes an optimal cooking mode, a cooking temperature, and a cooking time according to the type and weight of the ingredient. The cooking data may include a cooking mode and a cooking temperature according to the type of the ingredient and a cooking time according to the weight of the ingredient. The cooking data on the ingredient described above may be stored by a designer of the cooking apparatus 100 in advance and may be changed by the user.

In summary, the memory 113 may store the ingredient detection data for determining the type of the ingredient and the degree of progress in cooking of the ingredient based on the type and concentration of gas particles detected by the gas sensor 131, the ingredient nutritional content data including the nutritional contents and the percentages of the nutritional contents according to the type of the ingredient, and the cooking data on the ingredient, which includes the optimal cooking mode, cooking temperature, and cooking time according to the type and weight of the ingredient.

The memory 113 may include a volatile memory (not shown), such as a static random access memory (SRAM), a dynamic random access memory (DRAM), etc., and a nonvolatile memory (not shown) such as a flash memory, a read only memory (ROM), an erasable programmable ROM (EPROM), an electrically EPROM (EEPROM), etc.

The nonvolatile memory may operate as an auxiliary memory for the volatile memory and may store a control program and control data for controlling the operation of the cooking apparatus 100. The nonvolatile memory may retain stored data even when power to the cooking apparatus 100 is cut off.

The volatile memory may load and temporarily store the control program and control data from the nonvolatile memory or may temporarily store the setting value and control command input through the user interface 120, the temperature inside the cooking chamber and the type and concentration of gas detected by the sensor unit 130, and the control signal output by the processor 111. The volatile memory, different from the nonvolatile memory, may lose stored data when the power to the cooking apparatus 100 is cut off.

The processor 111 may process the setting value, the control command, the temperature inside the cooking chamber, and the type and concentration of gas based on the control program and control data stored in the memory 113 and may output a control signal for controlling the heating unit 140 and a communication signal to communicate with an external electronic apparatus.

For example, the processor 111 may determine the cooking mode, cooking temperature, and cooking time according to the setting value and control command input by the user. Also, the processor 111 may operate the heating unit 140 according to the temperature inside the cooking chamber detected by the temperature sensor 133 or may output a heating control signal to stop the operating of the heating unit 140.

Also, the processor 111 may determine the type of the ingredient, nutrients included in the ingredient, number of calories in the ingredient, the degree of cooking the ingredient based on the type and concentration of gas detected by the gas sensor 131 and may generate the cooking progress information and cooking-related information to be transmitted to the mobile terminal 210, the image display apparatus 220, the refrigerator 230, the audio output apparatus 240, the air conditioner 250, and the dishwasher 260.

In the above description, the processor 111 and the memory 113 have been separately described but the processor 111 and the memory 113 are not limited thereto and may be formed as a single chip.

As described above, the control unit 110 may control operations of all types of components included in the cooking apparatus 100. As another example the control unit 110 may determine a cooking parameter wherein the cooking parameter includes at least one of a degree of progress in a cooking operation of the food, a type of ingredient of the food, or a number of calories in the ingredient. Also, it will be understood that the operation of the cooking apparatus 100 which will be described below may be performed according to a control operation of the control unit 110.

As described above, the configuration of the cooking apparatus 100 has been described.

Hereinafter, the operation of the cooking apparatus 100 will be described.

The user may place an ingredient in the cooking chamber and may select a cooking mode through the user interface 120. Also, the user may input detailed setting values such as a cooking time and a cooking temperature according to each cooking mode. Afterward, when the user inputs a cooking start command through the user interface 120, the cooking apparatus 100 heats the ingredient contained in the cooking chamber.

Also, the user may place the ingredient in the cooking chamber and immediately may input an automatic cooking start command through the user interface 120. As described above, when the automatic cooking start command is input, the cooking apparatus 100 may detect the type and weight of the ingredient and may automatically set an optimal cooking mode, cooking time, and cooking temperature according to the detected type and weight of the ingredient.

Figure 5:
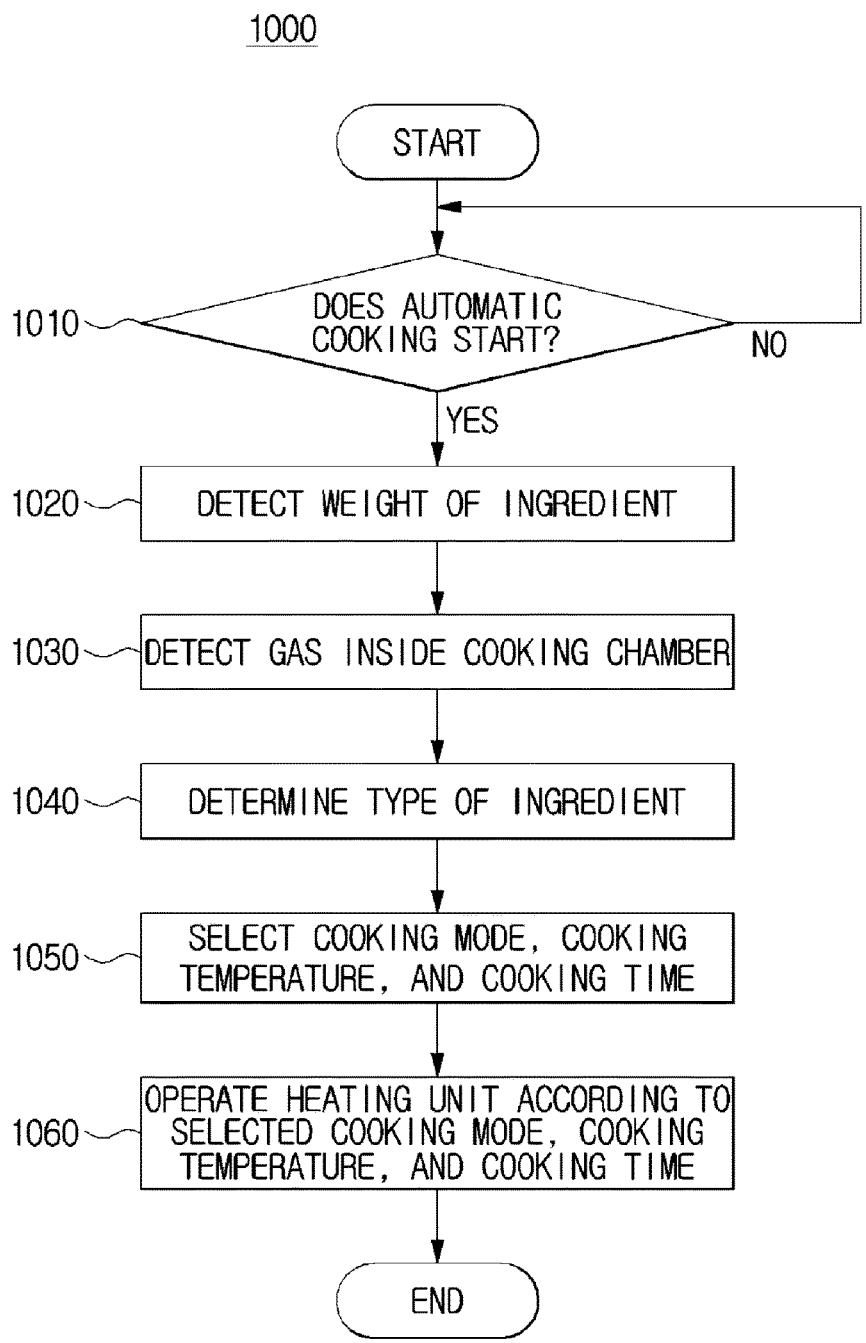
FIG. 5 illustrates an example of a cooking operation of the cooking apparatus according to one embodiment of the disclosure.
Figure 6:
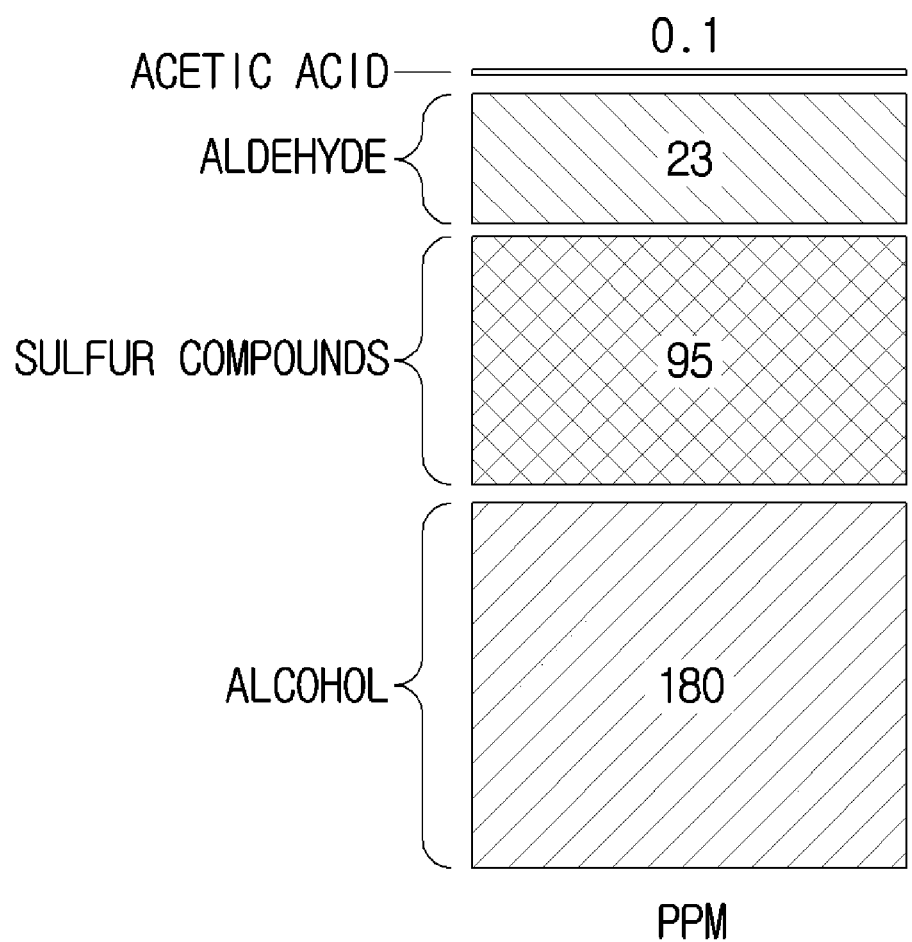
FIGS. 6, 7, and 8 illustrate types and amounts of particles generated according to types of ingredients.
Figure 7:
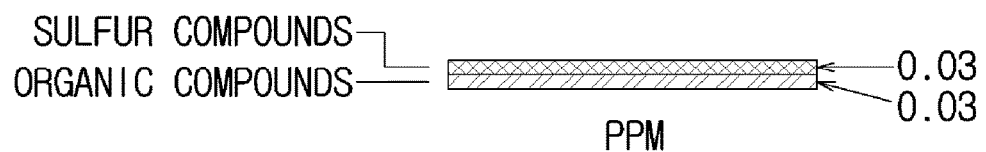
Figure 8:
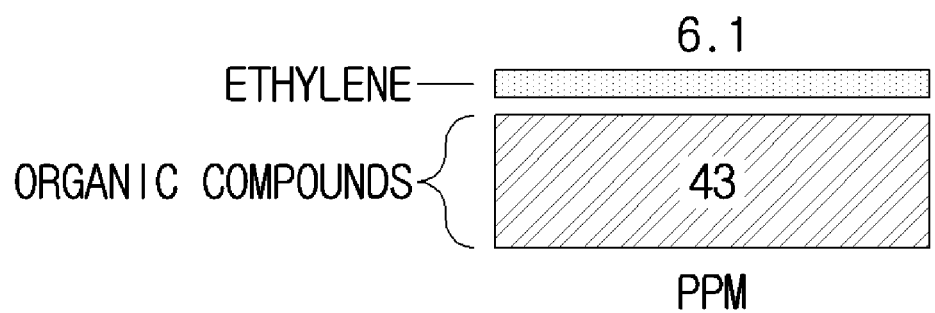

FIG. 5 illustrates an example of a cooking operation of the cooking apparatus 100 according to one embodiment of the disclosure. FIGS. 6 to 8 illustrate types and amounts of gases generated according to the type of the ingredient.

The cooking operation 1000 of the cooking apparatus 100 will be described with reference to FIGS. 5 to 8. As an example, the cooking apparatus 100 may determine a cooking parameter wherein the cooking parameter includes at least one of a degree of progress in a cooking operation of the food, a type of ingredient of the food, or a number of calories in the ingredient.

The cooking apparatus 100 determines whether to perform automatic cooking (operation 1010).

The control unit 110 of the cooking apparatus 100 may determine whether to perform the automatic cooking, depending on a control command input from the user through the user interface 120. For example, when the user places the ingredient in the cooking chamber and inputs an automatic cooking start command through the user interface 120, the control unit 110 starts the automatic cooking.

When it is determined to perform the automatic cooking (YES in operation 1010), the cooking apparatus 100 detects the weight of the ingredient (operation 1020).

The control unit 110 of the cooking apparatus 100 may detect the weight of the ingredient contained in the cooking chamber based on an electric signal output by the weight sensor 135.

Afterward, the cooking apparatus 100 detects a gas inside the cooking chamber (operation 1030).

The control unit 110 of the cooking apparatus 100 may detect the gas inside the cooking chamber using the gas sensor 131. Specifically, the control unit 110 may determine the type and concentration of the gas inside the cooking chamber based on frequencies of electric signals output by the plurality of QCMs 131-1, 131-2, 131-3, and 131-4 included in the gas sensor 131.

For example, the control unit 110 may determine the presence and concentration of hydrogen sulfide based on the frequency of the electric signal output by the first QCM 131-1 and may determine the presence and concentration of ethylene based on the frequency of the electric signal output by the second QCM 131-2.

Afterward, the cooking apparatus 100 determines the type of the ingredient (operation 1040).

The control unit 110 of the cooking apparatus 100 may determine the type of the ingredient based on the type and concentration of the gas detected by the gas sensor 131. For example, the control unit 110 may determine whether the ingredient is meat, fish, fruit, a dairy product, or fermented food.

The ingredient generates gases of different types and concentrations according to the type of the ingredient.

For example, as shown in FIG. 6, kimchi generates acetic acid of about 0.1 parts per million (ppm), aldehydes of about 23 ppm, sulfur compounds of about 95 ppm, and alcohol of about 180 ppm.

Also, as shown in FIG. 7, meat generates sulfur compounds of about 0.03 ppm and a volatile organic compound of about 0.03 ppm.

Also, as shown in FIG. 8, fruit generates ethylene of about 6.1 ppm and a volatile organic compound of about 43 ppm.

As described above, since the types and concentrations of generated gases differ according to the type of the ingredient, the control unit 110 may determine the type of the ingredient depending on the types and concentrations of the generated gases.

For example, when the gas sensor 131 detects high concentration hydrogen sulfide, the control unit 110 may determine the ingredient as kimchi. When the gas sensor 131 detects low concentration hydrogen sulfide, the control unit 110 may determine the ingredient as meat. Also, when the gas sensor 131 detects ethylene, the control unit 110 may determine the ingredient as fruit.

The types and concentrations of gases generated by the ingredient may be stored as a lookup table in advance in the memory 113 of the control unit 110. The control unit 110 may determine the type of the ingredient by referencing the lookup table in the memory 113.

Afterward, the cooking apparatus 100 selects a cooking mode, a cooking temperature, and a cooking time (operation 1050).

The control unit 110 of the cooking apparatus 100 may select the cooking mode, cooking temperature, and cooking time depending on the type of the ingredient and the weight of the ingredient.

For example, when the ingredient is meat or fish, the control unit 110 may select a grill mode for grilling the meat or fish. When the ingredient is grain, the control unit 110 may select a bake mode for baking bread. Also, when the ingredient contains lots of water, the control unit 110 may select one of a microwave mode and a steam mode to heat the ingredient.

Also, the control unit 110 may select an optimal cooking temperature according to the type of the ingredient and may select an optimal cooking time according to the weight of the ingredient.

Here, the control unit 110 may select the cooking mode, cooking temperature, and cooking time according to cooking data on the ingredient stored in the memory 113 in advance. Also, the cooking data on the ingredient may be stored by a designer of the cooking apparatus 100 in advance and may be changed by the user.

For example, when the user prefers the ingredient with a crispy outer surface, the cooking apparatus 100 may increase the time of one of the grill mode and bake mode. Also, when the user does not prefer to consume fat, the cooking apparatus 100 may select a cooking mode to reduce the fat content of the ingredient. Also, when the user prefers a fresh ingredient, the cooking apparatus 100 may reduce a cooking time for automatic cooking.

Afterward, the cooking apparatus 100 operates the heating unit 140 (operation 1060).

The control unit 110 of the cooking apparatus 100 may operate the heating unit 140 according to the selected cooking mode.

For example, when the grill mode is selected, the control unit 110 may operate one of the burner 141 and the hot wire 143 provided in an upper portion of the cooking chamber. When the bake mode is selected, the control unit 110 may operate one of the burner 141 and the hot wire 143 provided in a lower portion of the cooking chamber. Also, when the microwave mode is selected, the control unit 110 may operate the microwave generator 147. When the steam mode is selected, the control unit 110 may operate the steam generator 149.

As described above, when automatic cooking is selected, the cooking apparatus 100 may determine the type of the ingredient based on the type and concentration of gas inside the cooking chamber and may select the optimal cooking mode, cooking temperature, and cooking time according to the determined type of the ingredient.

Figure 9:
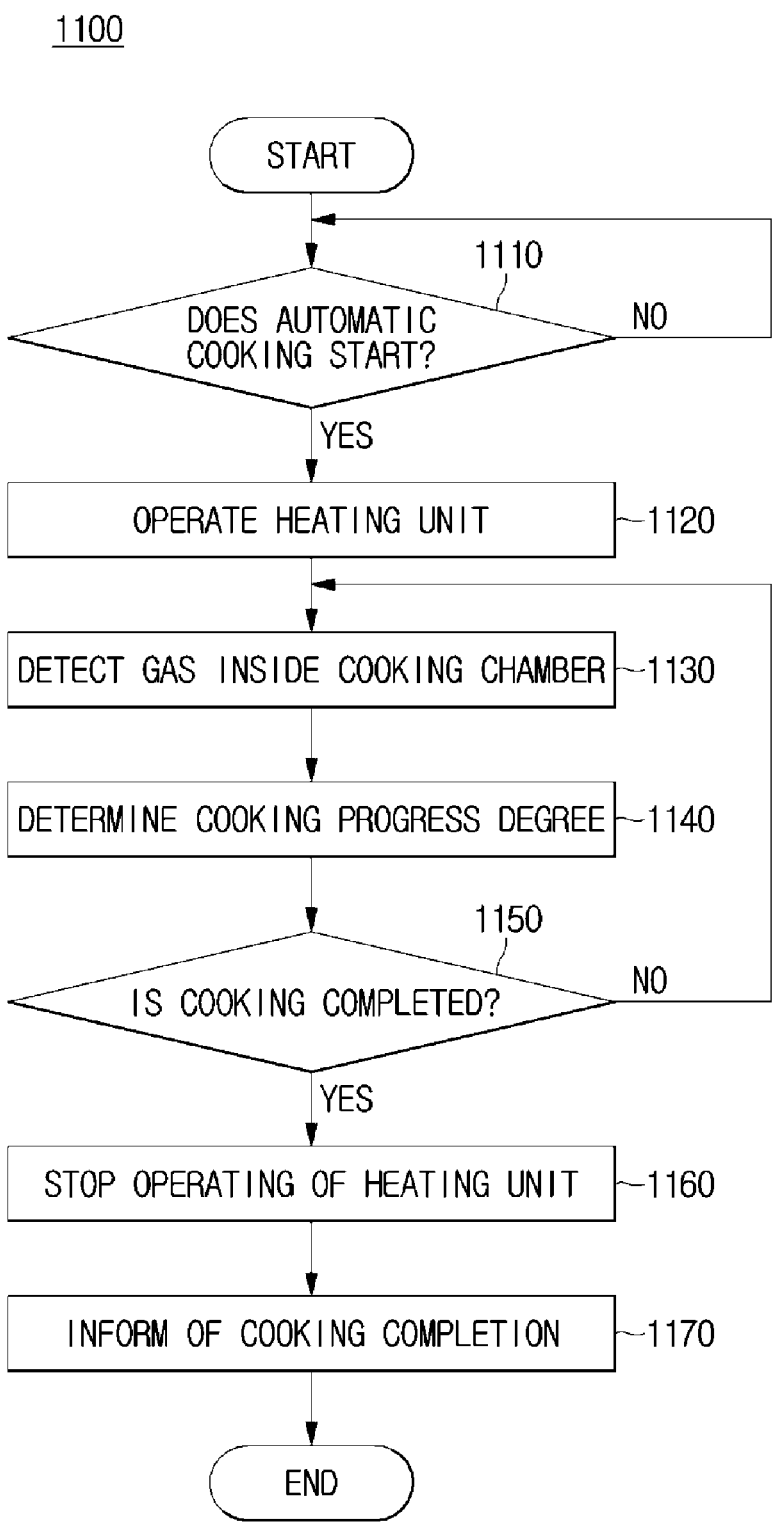
FIG. 9 illustrates another example of the cooking operation of the cooking apparatus according to one embodiment of the disclosure.
Figure 10:
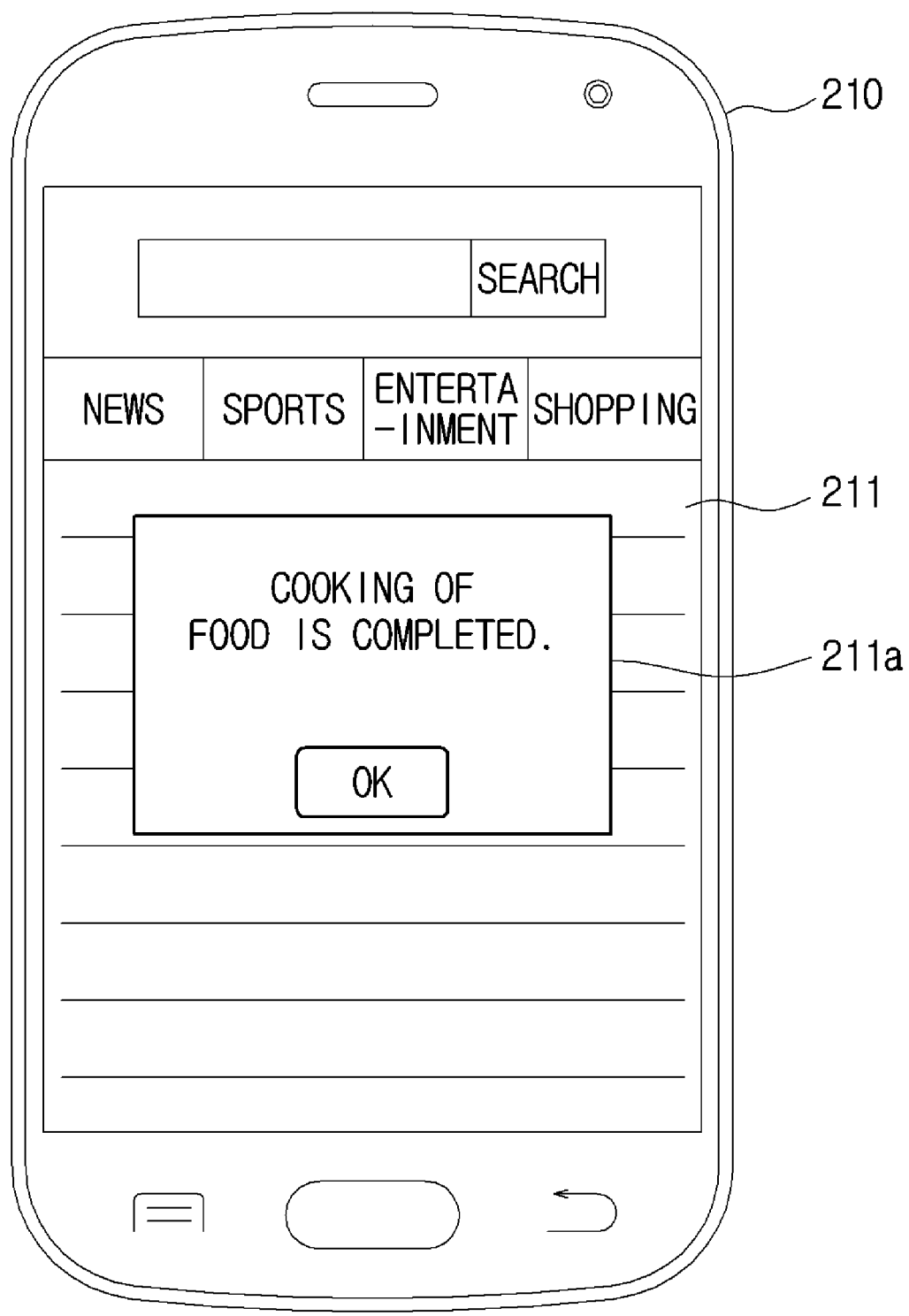
FIGS. 10, 11, and 12 illustrate examples of a screen displayed by an electronic apparatus which receives cooking progress information according to the cooking operation shown in FIG. 9.
Figure 11:
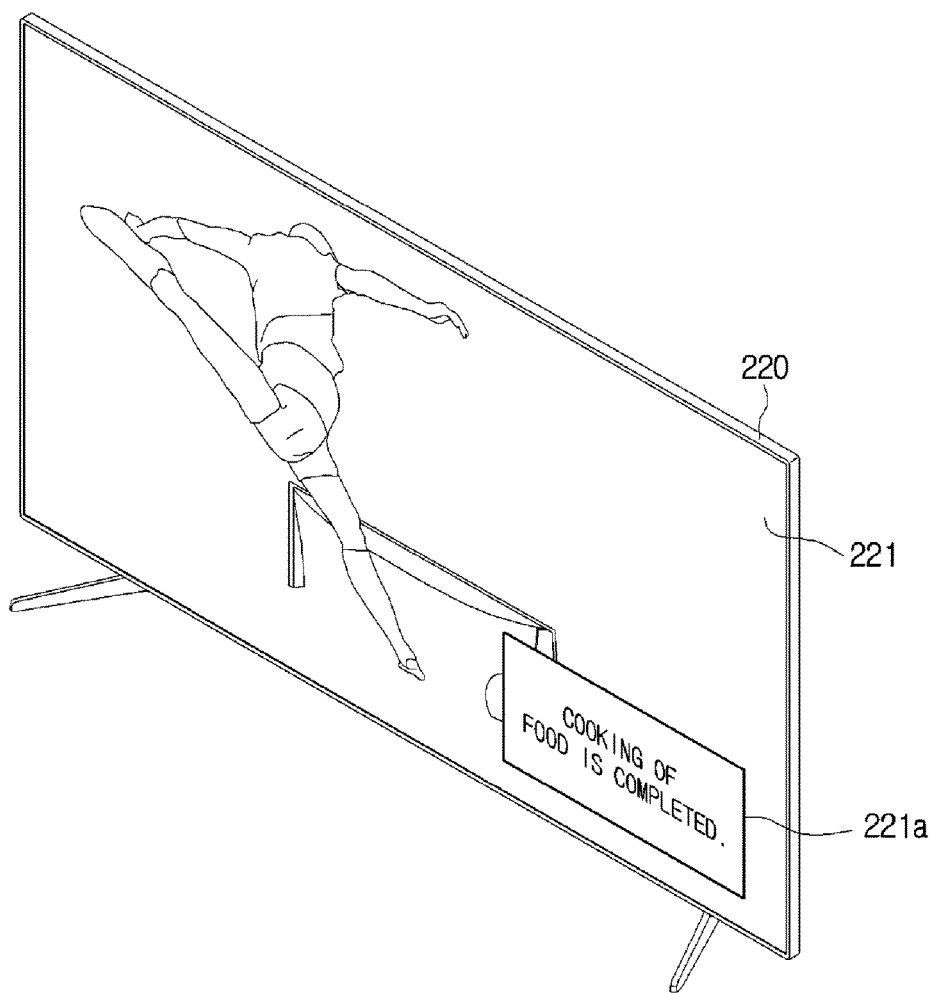
Figure 12:
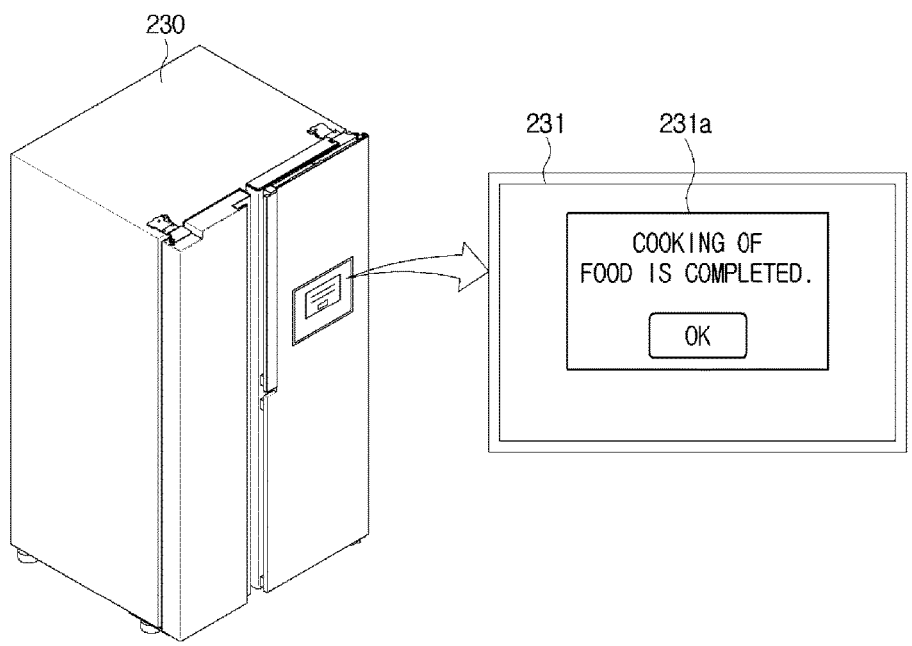

FIG. 9 illustrates another example of the cooking operation of the cooking apparatus 100 according to one embodiment of the disclosure. FIGS. 10, 11, and 12 illustrate examples of a screen displayed by an electronic apparatus which receives cooking progress information according to the cooking operation shown in FIG. 9.

The cooking operation 1100 of the cooking apparatus 100 will be described with reference to FIGS. 9, 10, 11, and 12.

The cooking apparatus 100 determines whether to perform automatic cooking (operation 1110).

The control unit 110 of the cooking apparatus 100 may determine whether to perform the automatic cooking, depending on a control command input from the user through the user interface 120. For example, when the user inputs an automatic cooking start command through the user interface 120, the control unit 110 starts the automatic cooking.

When it is determined to perform the automatic cooking (YES in operation 1110), the cooking apparatus 100 operates the heating unit 140 (operation 1120).

The control unit 110 of the cooking apparatus 100 may operate the heating unit 140 according to the selected cooking mode.

For example, when a grill mode is selected, the control unit 110 may operate one of the burner 141 and the hot wire 143 provided in an upper portion of the cooking chamber. When a bake mode is selected, the control unit 110 may operate one of the burner 141 and the hot wire 143 provided in a lower portion of the cooking chamber. Also, when a microwave mode is selected, the control unit 110 may operate the microwave generator 147. When a steam mode is selected, the control unit 110 may operate the steam generator 149.

Afterward, the cooking apparatus 100 detects a gas inside the cooking chamber (operation 1130).

The control unit 110 of the cooking apparatus 100 may detect the gas inside the cooking chamber using the gas sensor 131. Specifically, the control unit 110 may determine the type and concentration of the gas inside the cooking chamber based on frequencies of electric signals output by the plurality of QCMs 131-1, 131-2, 131-3, and 131-4 included in the gas sensor 131.

For example, the control unit 110 may determine the presence and concentration of hydrogen sulfide based on the frequency of the electric signal output by the first QCM 131-1 and may determine the presence and concentration of ethylene based on the frequency of the electric signal output by the second QCM 131-2.

Afterward, the cooking apparatus 100 determines a degree of progress in a cooking operation (operation 1140).

The control unit 110 of the cooking apparatus 100 may determine the degree of progress in cooking of the ingredient based on the type or the concentration of the gas detected by the gas sensor 131, or both.

The control unit 110 may determine the degree of progress in cooking based on the concentration of a certain gas. The control unit 110 may calculate a rate of change in concentration of the certain gas and may determine the degree of progress in cooking based on the calculated rate of change in concentration. For example, in one of the grill mode and bake mode, as cooking has progressed, the concentration of water decreases. Accordingly, the control unit 110 may determine the degree of progress in cooking based on the concentration of water inside the cooking chamber.

Afterward, the cooking apparatus 100 determines whether cooking is completed (operation 1150).

The control unit 110 of the cooking apparatus 100 may determine whether the cooking is completed, according to the degree of progress in cooking determined previously. For example, the control unit 110 may determine that the cooking is completed when the concentration of a certain gas is higher than a reference value or when the concentration of a certain gas is lower than a reference value. For example, in one of the grill mode and the bake mode, the control unit 110 may determine that the cooking is completed when the concentration of water inside the cooking chamber is lower than a reference value.

When the cooking is not determined to be completed (NO in operation 1150), the cooking apparatus 100 may repetitively perform the detecting of gas (operation 1130), the determining of the degree of progress in cooking (operation 1140), and the determining of the completion of cooking (operation 1150).

When it is determined that cooking is completed (YES in operation 1150), the cooking apparatus 100 stops the operating of the heating unit 140 (operation 1160).

Also, the cooking apparatus 100 informs the user of the completion of cooking (operation 1170).

The control unit 110 of the cooking apparatus 100 may inform the user of the completion of cooking using various methods.

For example, the control unit 110 may indicate the completion of cooking to the user through the user interface 120 included in the cooking apparatus 100.

As another example, the control unit 110 may transmit a cooking completion display request to one or more of the mobile terminal 210, the image display apparatus 220, the refrigerator 230, the audio output apparatus 240, the air conditioner 250, and the dishwasher 260 through the communication unit 150.

When the control unit 110 transmits the cooking completion display request to the mobile terminal 210, as shown in FIG. 10, the mobile terminal 210 may display a cooking completion display image 211a which indicates the completion of cooking on a display 211. The user may recognize that cooking is completed by the cooking apparatus 100, through the cooking completion display image 211a displayed on the mobile terminal 210.

Also, when the control unit 110 transmits the cooking completion display request to the image display apparatus 220, as shown in FIG. 11, the image display apparatus 220 may display a cooking completion display image 221a which indicates the completion of cooking on one side of a display 221. The user may recognize that cooking is completed by the cooking apparatus 100, through the cooking completion display image 221a displayed on the image display apparatus 220.

Also, when the control unit 110 transmits the cooking completion display request to the refrigerator 230, as shown in FIG. 12, the refrigerator 230 may display a cooking completion display image 231a which indicates the completion of cooking on one side of a display 231. The user may recognize that cooking is completed by the cooking apparatus 100, through the cooking completion display image 231a displayed on the refrigerator 230.

In addition, when the control unit 110 transmits a cooking completion display request to the audio output apparatus 240, the audio output apparatus 240 may output an audio signal or tone which indicates the completion of cooking.

As described above, when automatic cooking is selected, the cooking apparatus 100 may determine a degree of progress in cooking based on a type and concentration of a gas inside the cooking chamber and may inform the user of the completion of cooking through various electronic apparatuses when it is determined that cooking is completed.

Figure 13:
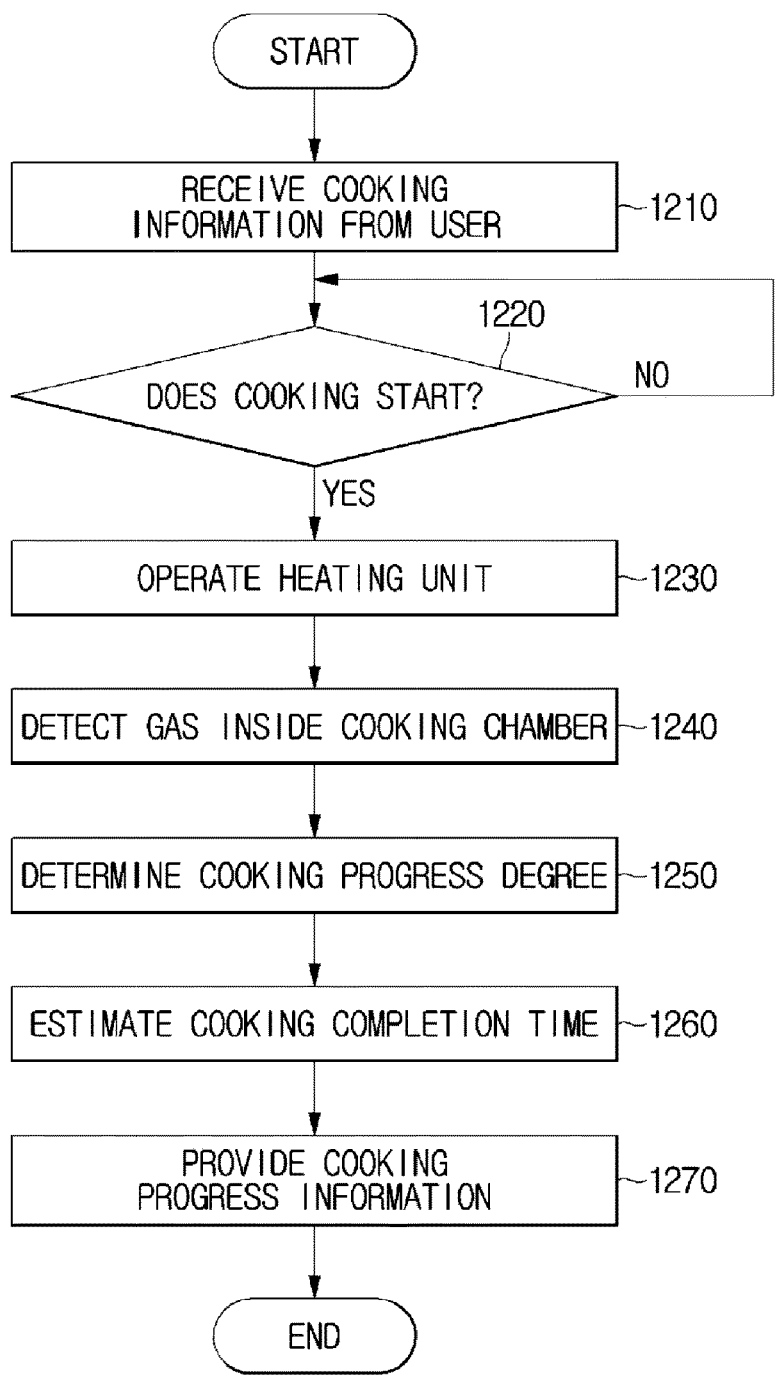
FIG. 13 illustrates still another example of the cooking operation of the cooking apparatus according to one embodiment of the disclosure.
Figure 14:
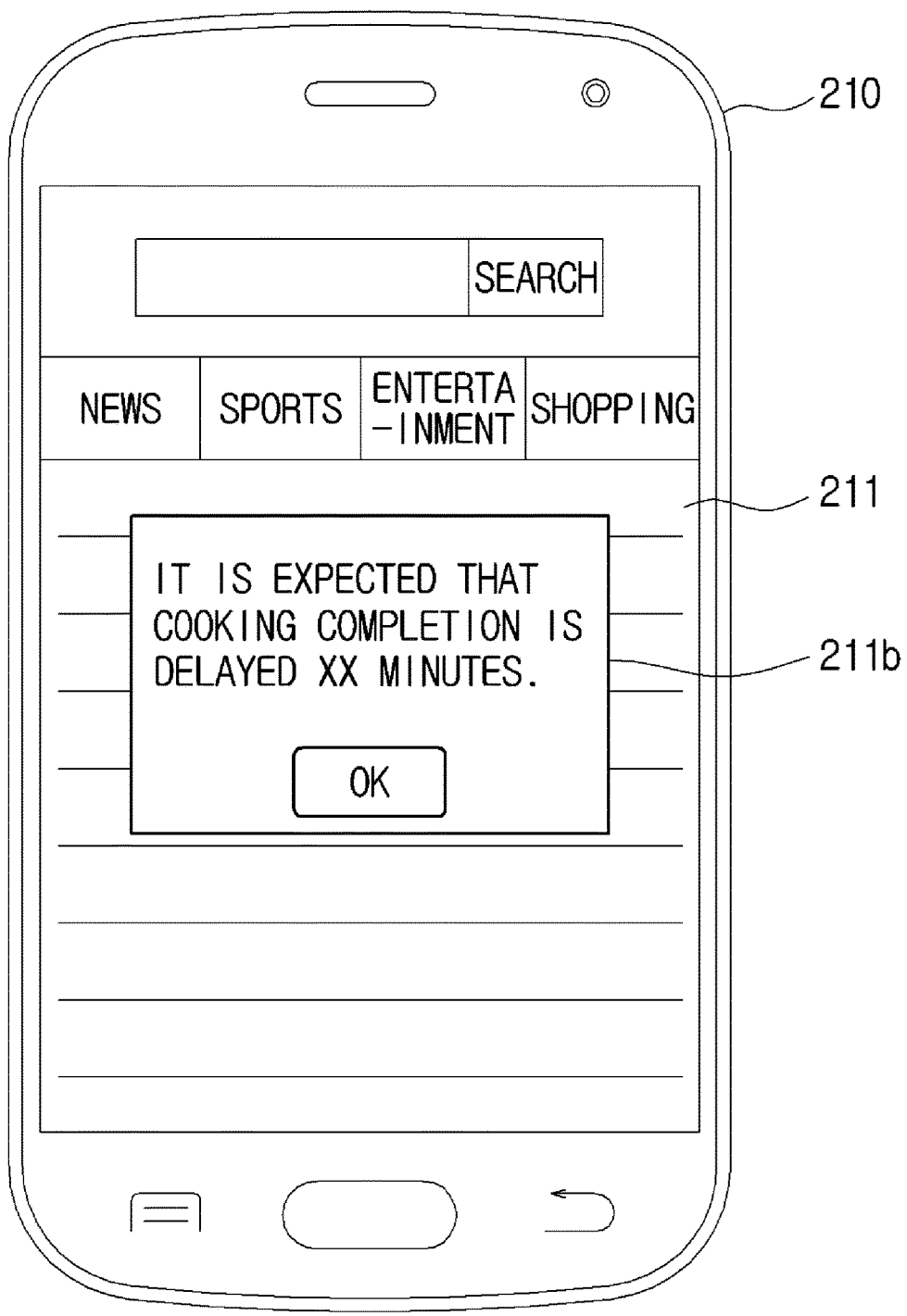
FIG. 14 illustrates an example of a screen displayed by an electronic apparatus which receives cooking progress information according to the cooking operation shown in FIG. 13.

FIG. 13 illustrates still another example of the cooking operation of the cooking apparatus 100 according to one embodiment of the disclosure. FIG. 14 illustrates an example of a screen displayed by an electronic apparatus which receives cooking progress information according to the cooking operation shown in FIG. 13.

The cooking operation 1200 of the cooking apparatus 100 will be described with reference to FIGS. 13 and 14.

The cooking apparatus 100 receives cooking information from the user (operation 1210).

The user interface 120 of the cooking apparatus 100 receives the cooking information including a cooking mode, a cooking temperature, and a cooking time from the user and outputs an electric signal corresponding to the input cooking information to the control unit 110.

The cooking apparatus 100 determines whether to start cooking (operation 1220).

The control unit 110 of the cooking apparatus 100 may determine whether to perform manual cooking, depending on a control command input from the user through the user interface 120. For example, when the user inputs the cooking information and a cooking start command through the user interface 120, the control unit 110 starts the manual cooking according to the input cooking information.

When it is determined to perform the cooking (YES in operation 1220), the cooking apparatus 100 operates the heating unit 140 (operation 1230).

The control unit 110 of the cooking apparatus 100 may operate the heating unit 140 according to a cooking mode selected by the user.

For example, when a grill mode is selected, the control unit 110 may operate one of the burner 141 and the hot wire 143 provided in an upper portion of the cooking chamber. When a bake mode is selected, the control unit 110 may operate one of the burner 141 and the hot wire 143 provided in a lower portion of the cooking chamber. Also, when a microwave mode is selected, the control unit 110 may operate the microwave generator 147. When a steam mode is selected, the control unit 110 may operate the steam generator 149.

Afterward, the cooking apparatus 100 detects a gas inside the cooking chamber (operation 1240).

The control unit 110 of the cooking apparatus 100 may detect the gas inside the cooking chamber using the gas sensor 131. Specifically, the control unit 110 may determine the type and concentration of the gas inside the cooking chamber based on frequencies of electric signals output by the plurality of QCMs 131-1, 131-2, 131-3, and 131-4 included in the gas sensor 131.

For example, the control unit 110 may determine the presence and concentration of hydrogen sulfide based on the frequency of the electric signal output by the first QCM 131-1 and may determine the presence and concentration of ethylene based on the frequency of the electric signal output by the second QCM 131-2.

Afterward, the cooking apparatus 100 determines a degree of progress in a cooking operation (operation 1250).

The control unit 110 of the cooking apparatus 100 may determine a degree of progress in cooking of an ingredient based on the type and concentration of the gas detected by the gas sensor 131.

The control unit 110 may determine the degree of progress in cooking based on the concentration of a certain gas. The control unit 110 may calculate a rate of change in concentration of the certain gas and may determine the degree of progress in cooking based on the calculated rate of change in concentration.

For example, it has been known that a pyridine-based material is generated when protein is pyrolyzed. The control unit 110 may detect the concentration of the pyridine-based material and may determine the degree of progress in cooking of the ingredient based on a change in concentration of the pyridine-based material. In addition, the control unit 110 may determine the degree of progress in cooking of the ingredient based on changes in concentrations of acetophenone, benzyl alcohol, and benzaldehyde.

Afterward, the cooking apparatus 100 estimates a cooking completion time (operation 1260).

The control unit 110 of the cooking apparatus 100 may estimate the cooking completion time based on the degree of progress in cooking. Also, the control unit 110 may determine a difference between the estimated cooking completion time and the cooking time input by the user.

Afterward, the cooking apparatus 100 provides the user with cooking progress information (operation 1270).

The cooking progress information may indicate a degree of cooking the ingredient and may be changed into various types of information to be provided to the user. For example, the cooking progress information may be provided to the user as information on a cooking completion time according to the degree of progress in cooking or as information on whether the ingredient is overcooked or undercooked depending on the degree of progress in cooking.

The control unit 110 of the cooking apparatus 100 may estimate the cooking time based on the degree of progress in cooking, and may inform whether the ingredient will be overcooked or undercooked base on the estimate cooking time. Also, the control unit 110 may provide the user with a cooking guide according to whether the ingredient is overcooked or undercooked.

Specifically, when the estimated cooking time is shorter than the cooking time input by the user, the control unit 110 may estimate that the ingredient will be overcooked. Also, the control unit 110 may inform the user to reduce the cooking time.

For example, the control unit 110 may inform the user to reduce the cooking time through the user interface 120 included in the cooking apparatus 100 or through the mobile terminal 210, the image display apparatus 220, the refrigerator 230, the audio output apparatus 240, the air conditioner 250, and the dishwasher 260.

Here, when the user does not reduce the cooking time, the control unit 110 may delay a cooking completion time by lowering a cooking temperature.

Also, when the estimated cooking time is longer than the cooking time input by the user, the control unit 110 may estimate that the ingredient will be undercooked. Also, the control unit 110 may inform the user to extend the cooking time or to additionally perform cooking.

For example, the control unit 110 may inform the user to extend the cooking time through the user interface 120 included in the cooking apparatus 100 or through the mobile terminal 210, the image display apparatus 220, the refrigerator 230, the audio output apparatus 240, the air conditioner 250, and the dishwasher 260.

Here, when the user does not extend the cooking time, the control unit 110 may reduce a cooking completion time by increasing a cooking temperature.

Also, the control unit 110 may estimate the cooking time based on the degree of progress in cooking and may provide the user with a cooking completion time according to the estimated cooking time. Specifically, the control unit 110 may display an estimated cooking completion time through the user interface 120 included in the cooking apparatus 100.

Also, the control unit 110 may transmit information on the estimated cooking completion time through the mobile terminal 210, the image display apparatus 220, the refrigerator 230, the audio output apparatus 240, the air conditioner 250, and the dishwasher 260. When the control unit 110 transmits the information on the estimated cooking completion time to the mobile terminal 210, as shown in FIG. 10, the mobile terminal 210 may display an estimated cooking completion time image 211b which indicates the estimated cooking completion time on the display 211. The user may recognize a point in time that cooking is completed by the cooking apparatus 100, through the estimated cooking completion time image 211b displayed on the mobile terminal 210. Also, the control unit 110 may transmit an estimated time display request to the image display apparatus 220, the refrigerator 230, and the audio output apparatus 240.

Also, the control unit 110 may provide the user with a remaining cooking time. The control unit 110 may inform the user of the remaining cooking time through the user interface 120 included in the cooking apparatus 100. Also, the control unit 110 may transmit information on the remaining cooking time to be displayed to user through the mobile terminal 210, the image display apparatus 220, the refrigerator 230, the audio output apparatus 240, the air conditioner 250, and the dishwasher 260.

As described above, when the manual cooking is selected, the cooking apparatus 100 may determine the degree of progress in cooking based on the type and concentration of the gas inside the cooking chamber and may determine the estimated cooking completion time based on the degree of progress in cooking. Also, the cooking apparatus 100 may inform the user of the estimated cooking completion time through various electronic apparatuses.

Figure 15:
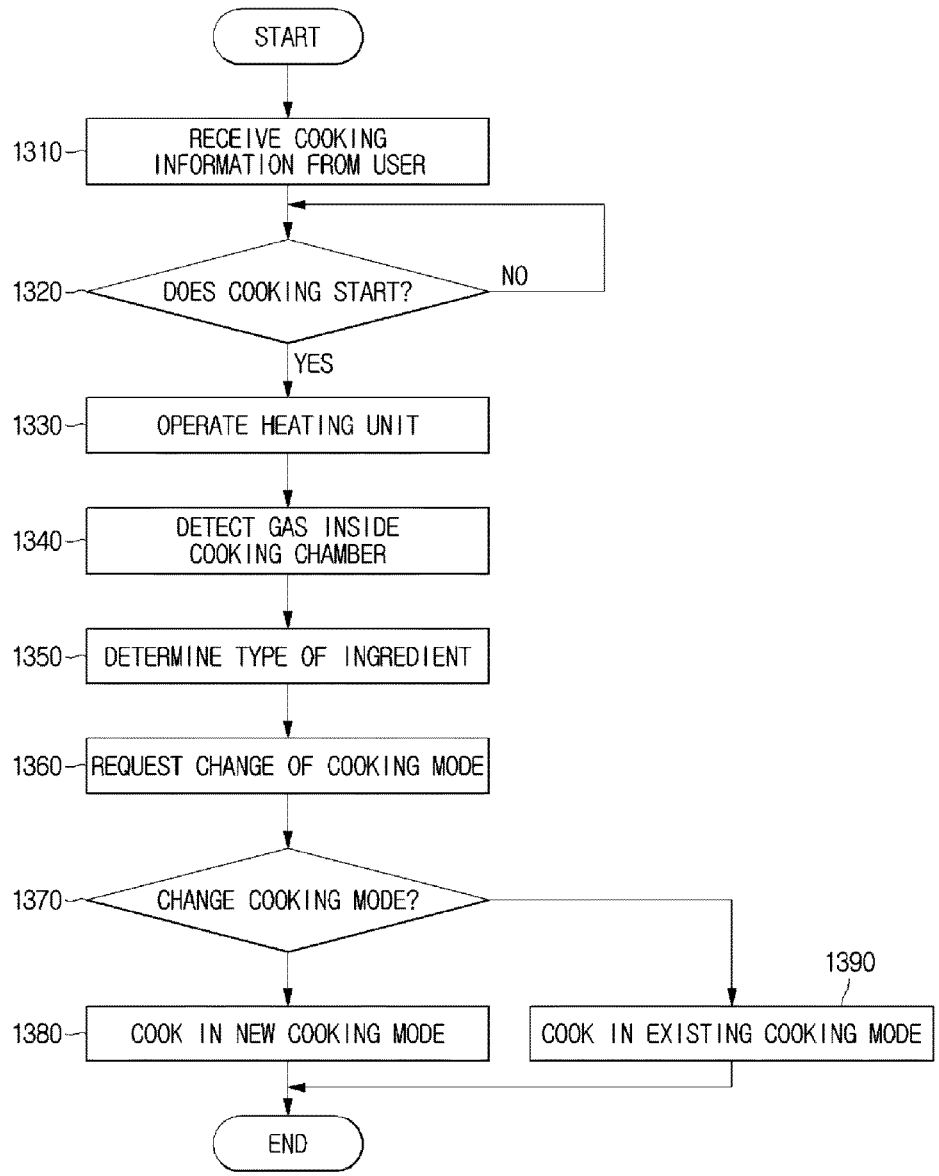
FIG. 15 illustrates yet another example of the cooking operation of the cooking apparatus according to one embodiment of the disclosure.
Figure 16:
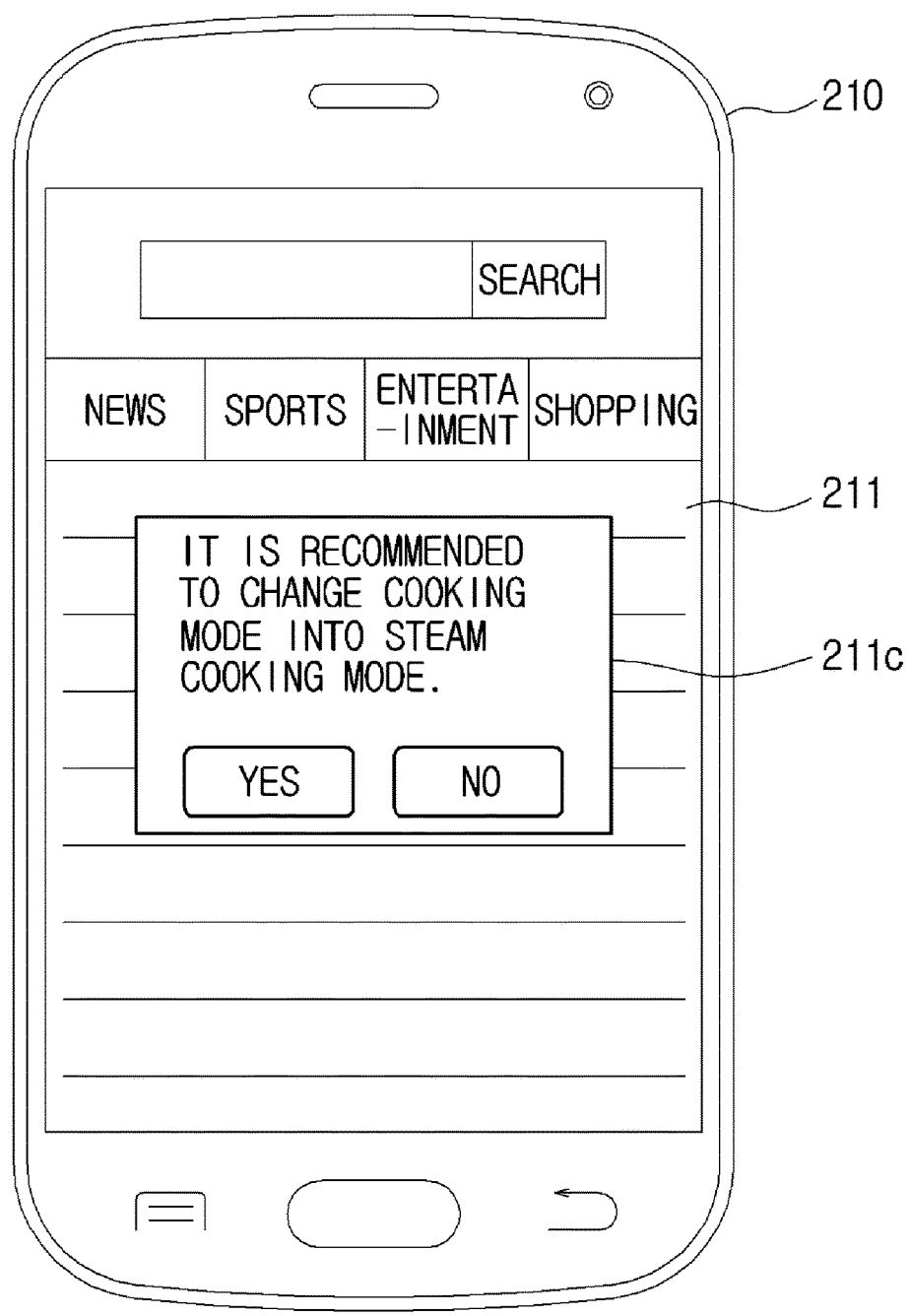
FIG. 16 illustrates an example of a screen displayed by an electronic apparatus which receives cooking progress information according to the cooking operation shown in FIG. 15.

FIG. 15 illustrates yet another example of the cooking operation of the cooking apparatus 100 according to one embodiment of the disclosure. FIG. 16 illustrates an example of a screen displayed by an electronic apparatus which receives cooking progress information according to the cooking operation shown in FIG. 15.

The cooking operation 1300 of the cooking apparatus 100 will be described with reference to FIGS. 15 and 16.

The cooking apparatus 100 receives cooking information from the user (operation 1310).

The user interface 120 of the cooking apparatus 100 receives the cooking information including a cooking mode, a cooking temperature, and a cooking time from the user and outputs an electric signal corresponding to the input cooking information to the control unit 110.

The cooking apparatus 100 determines whether to perform cooking (operation 1320).

The control unit 110 of the cooking apparatus 100 may determine whether to perform manual cooking, depending on a control command input from the user through the user interface 120. For example, when the user inputs the cooking information and a cooking start command through the user interface 120, the control unit 110 starts the manual cooking according to the input cooking information.

When it is determined to perform the cooking (YES in operation 1320), the cooking apparatus 100 operates the heating unit 140 (operation 1330).

The control unit 110 of the cooking apparatus 100 may operate the heating unit 140 according to a cooking mode selected by the user.

For example, when a grill mode is selected, the control unit 110 may operate one of the burner 141 and the hot wire 143 provided in an upper portion of the cooking chamber. When a bake mode is selected, the control unit 110 may operate one of the burner 141 and the hot wire 143 provided in a lower portion of the cooking chamber. Also, when a microwave mode is selected, the control unit 110 may operate the microwave generator 147. When a steam mode is selected, the control unit 110 may operate the steam generator 149.

Afterward, the cooking apparatus 100 detects a gas inside the cooking chamber (operation 1340).

The control unit 110 of the cooking apparatus 100 may detect the gas inside the cooking chamber using the gas sensor 131. Specifically, the control unit 110 may determine the type and concentration of the gas inside the cooking chamber based on frequencies of electric signals output by the plurality of QCMs 131-1, 131-2, 131-3, and 131-4 included in the gas sensor 131.

For example, the control unit 110 may determine the presence and concentration of hydrogen sulfide based on the frequency of the electric signal output by the first QCM 131-1 and may determine the presence and concentration of ethylene based on the frequency of the electric signal output by the second QCM 131-2.

Afterward, the cooking apparatus 100 determines the type of the ingredient (operation 1350).

The control unit 110 of the cooking apparatus 100 may determine the type of the ingredient based on the type and concentration of the gas detected by the gas sensor 131. For example, the control unit 110 may determine whether the ingredient is meat, fish, fruit, a dairy product, or fermented food.

The ingredient may generate gases of different types and concentrations according to the type of the ingredient. Since the types and concentrations of generated gases differ according to the type of the ingredient, the control unit 110 may determine the type of the ingredient depending on the type and concentration of the generated gas.

The types and concentrations of gases generated by the ingredient may be stored as a lookup table in advance in the memory 113 of the control unit 110. The control unit 110 may determine the type of the ingredient by referencing the lookup table in the memory 113.

Afterward, the cooking apparatus 100 determines whether to change the cooking mode and requests changing of the cooking mode from the user (operation 1360).

The cooking apparatus 100 may determine whether the cooking mode input by the user is appropriate with respect to the determined type of the ingredient. For example, when the user selects a bake mode with respect to meat or fish, the control unit 110 may determine that a grill mode is more appropriate with respect to meat or fish than the bake mode.

Here, the cooking apparatus 100 may determine whether the cooking mode is appropriate based on the type of the ingredient and health information input by the user. For example, when the user has a high body fat percentage and selects the bake mode with respect to meat or fish, the control unit 110 may determine that a steam mode is more appropriate to reduce the fat from the meat or fish.

As described above, when the cooking mode selected by the user is inappropriate, the control unit 110 may request changing of the cooking mode by the user.

For example, the control unit 110 may request the changing of the cooking mode by the user through the user interface 120 included in the cooking apparatus 100.

As another example, the control unit 110 may transmit a cooking mode change request to the mobile terminal 210, the image display apparatus 220, the refrigerator 230, the audio output apparatus 240, the air conditioner 250, and the dishwasher 260 through the communication unit 150.

When the control unit 110 transmits the cooking mode change request to the mobile terminal 210, as shown in FIG. 16, the mobile terminal 210 may display a mode change request image 211c which indicates the cooking mode change request on the display 211.

The user may input the acceptance or rejection of changing the cooking mode through the mode change request image 211c displayed on the mobile terminal 210.

When the acceptance of changing the cooking mode is received, the mobile terminal 210 may transmit a mode change acceptance to the cooking apparatus 100. When the rejection of changing of the cooking mode is received, the mobile terminal 210 may transmit a mode change rejection to the cooking apparatus 100.

Also, the control unit 110 may transmit the cooking mode change request to the image display apparatus 220, the refrigerator 230, and the audio output apparatus 240.

The cooking apparatus 100 determines whether to change the cooking mode (operation 1370).

The control unit 110 of the cooking apparatus 100 may determine whether to change the cooking mode, according to a message received from an electronic apparatus such as the mobile terminal 210.

For example, when the mode change acceptance is received, the control unit 110 changes the cooking mode. When the mode change rejection is received, the control unit 110 maintains an existing cooking mode.

When it is determined to change the cooking mode (YES in operation 1370), the cooking apparatus 100 cooks the ingredient in a new cooking mode (operation 1380).

The control unit 110 of the cooking apparatus 100 may select an optimal cooking mode with respect to the ingredient and may operate the heating unit 140 according to the selected cooking mode.

Also, when it is determined not to change the cooking mode (NO in operation 1370), the cooking apparatus 100 cooks the ingredient in the existing cooking mode (operation 1390).

The control unit 110 of the cooking apparatus 100 may operate the heating unit 140 according to the existing cooking mode.

As described above, when the manual cooking is selected, the cooking apparatus 100 may determine an ingredient based on the type and concentration of a gas inside the cooking chamber and may request changing of a cooking mode depending on the determined ingredient.

Figure 17:
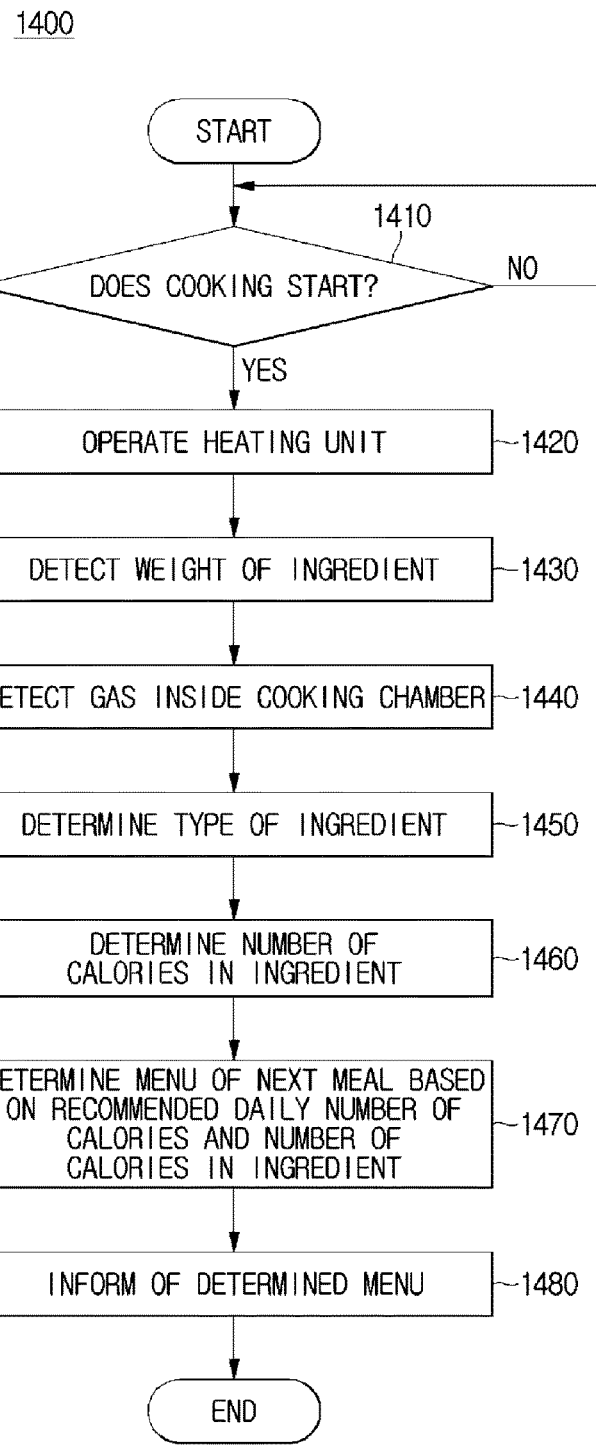
FIG. 17 illustrates yet another example of the cooking operation of the cooking apparatus according to one embodiment of the disclosure.
Figure 18:
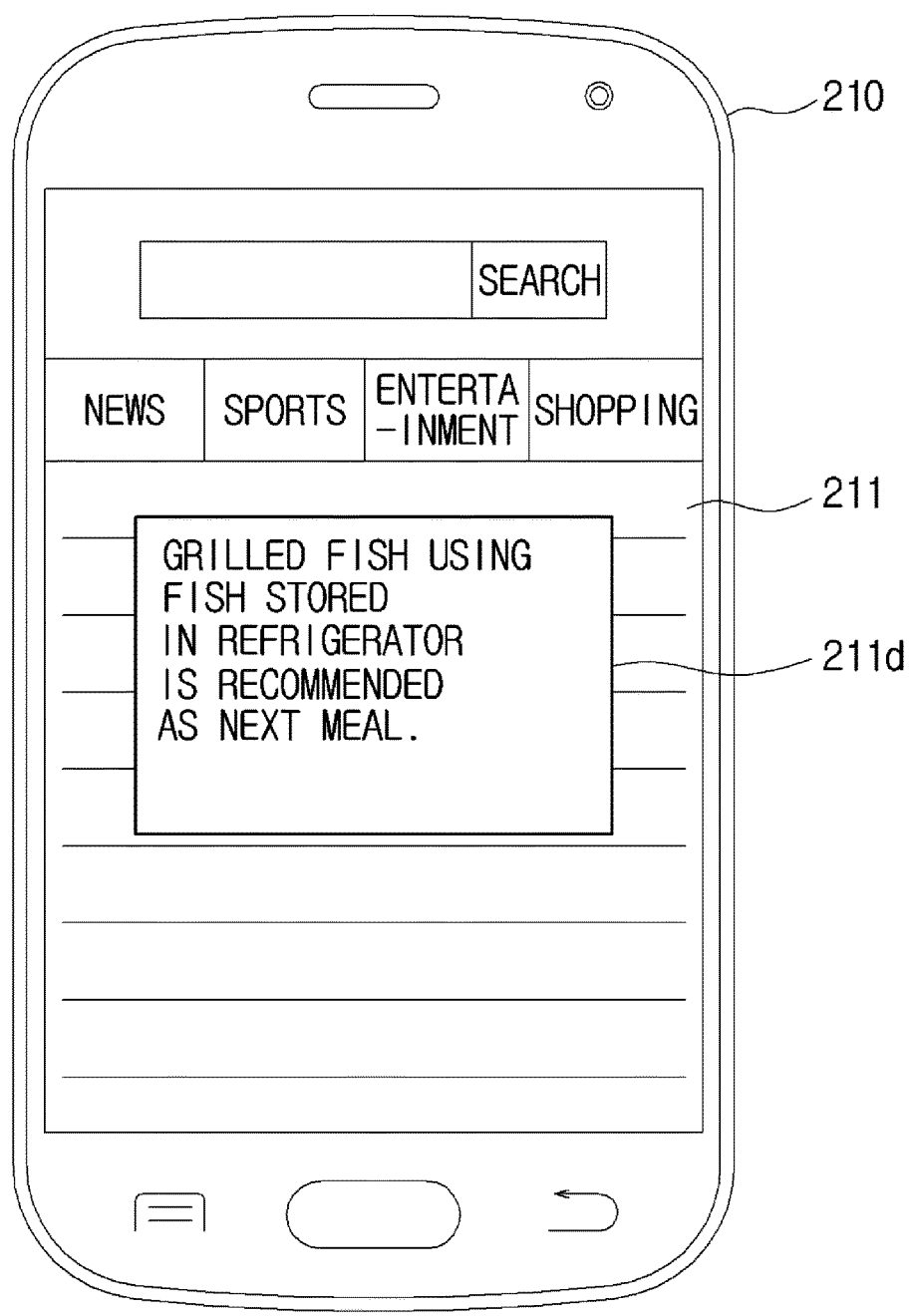
FIGS. 18, 19, and 20 illustrate examples of screens displayed by electronic apparatuses which receive cooking progress information according to the cooking operation shown in FIG. 17.
Figure 19:
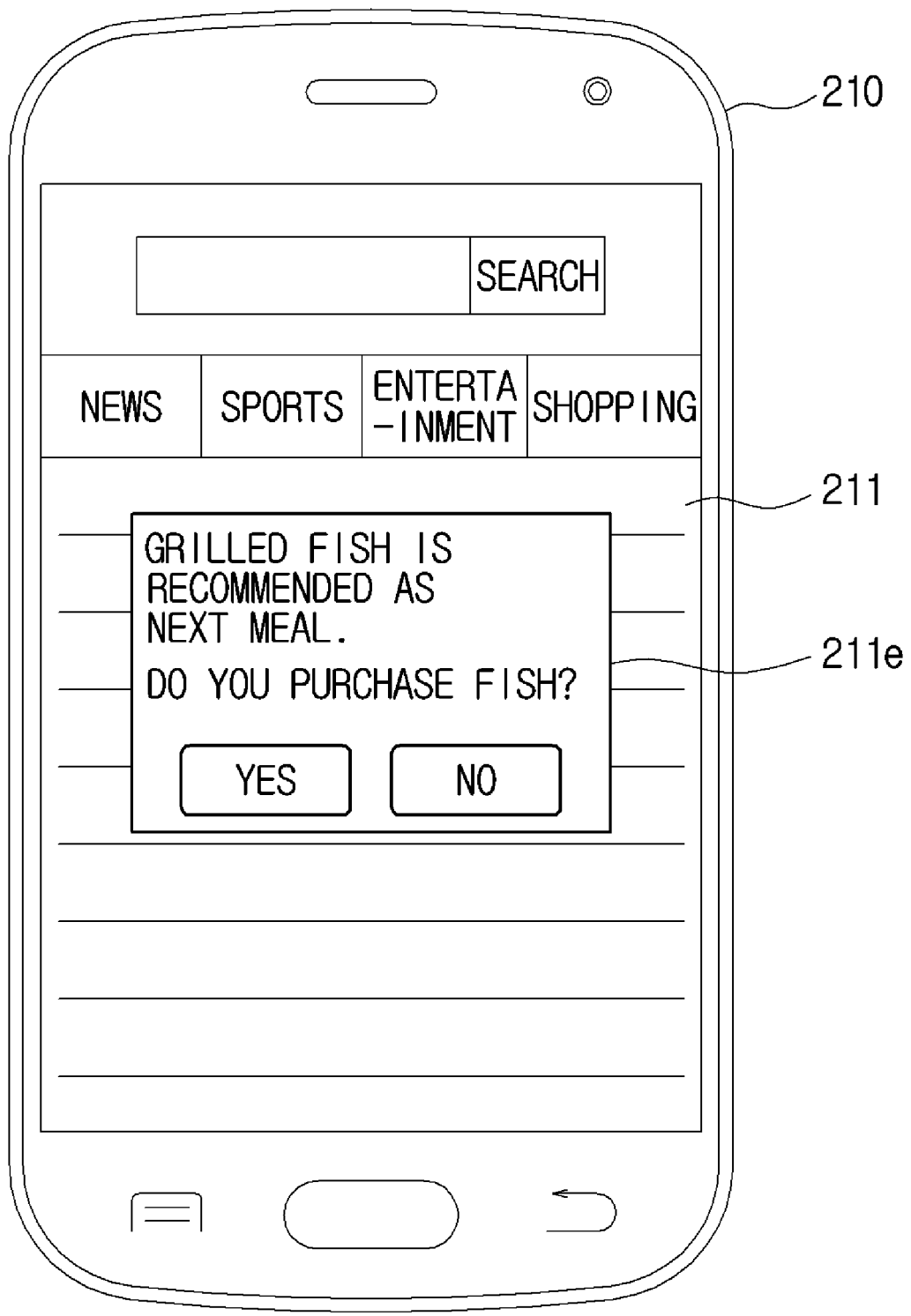
Figure 20:
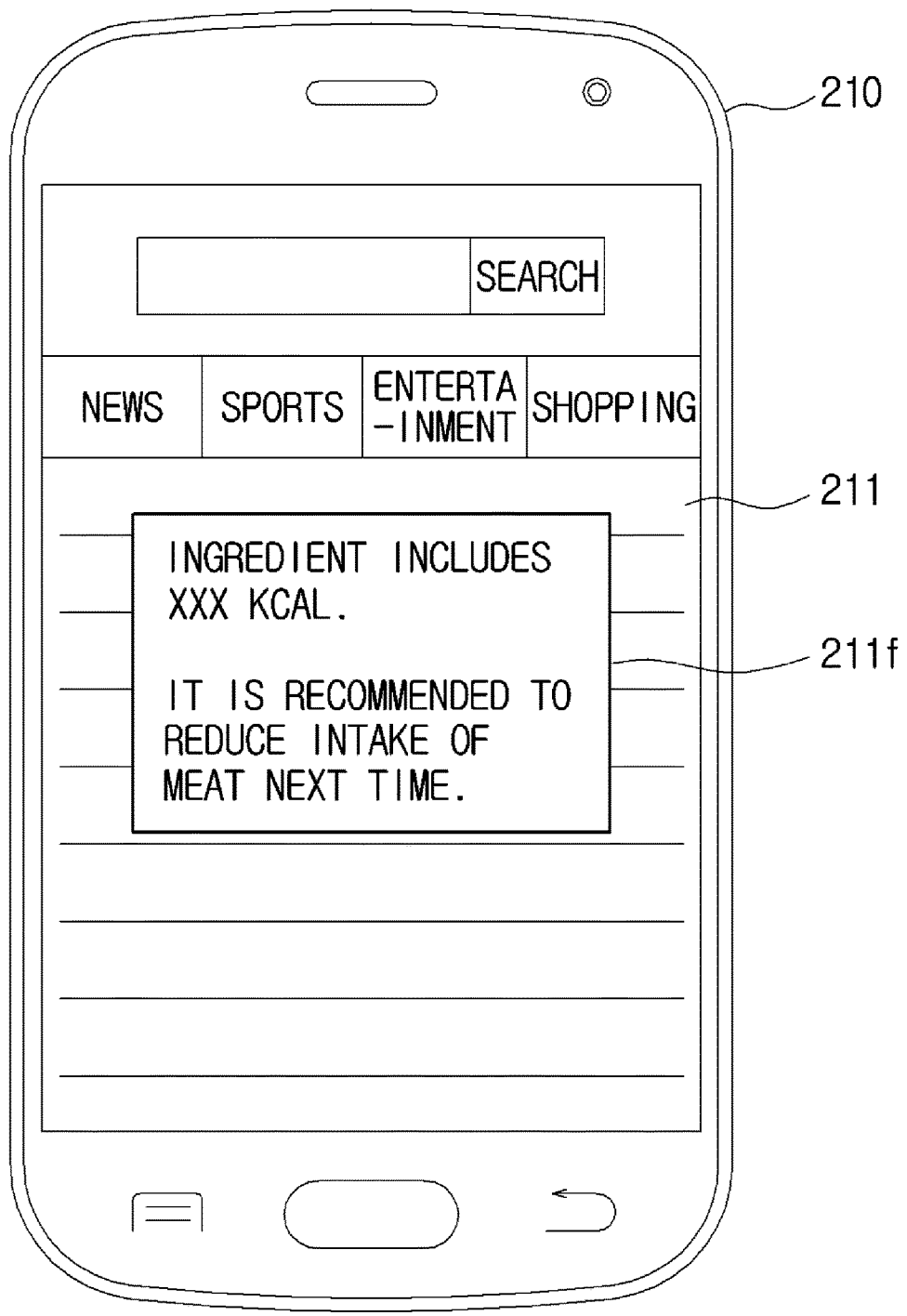

FIG. 17 illustrates yet another example of the cooking operation of the cooking apparatus 100 according to one embodiment of the disclosure. FIGS. 18 to 20 illustrate examples of a screen displayed by an electronic apparatus which receives cooking progress information according to the cooking operation shown in FIG. 17.

The cooking operation 1400 of the cooking apparatus 100 will be described with reference to FIGS. 17 to 20.

The cooking apparatus 100 determines whether to perform cooking (operation 1410).

The control unit 110 of the cooking apparatus 100 may determine whether to perform cooking, depending on a control command input from the user through the user interface 120. For example, when the user inputs a cooking start command through the user interface 120, the control unit 110 starts cooking.

When it is determined to perform cooking (YES in operation 1410), the cooking apparatus 100 operates the heating unit 140 (operation 1420).

The control unit 110 of the cooking apparatus 100 may operate the heating unit 140 according to a cooking mode input by the user or a cooking mode selected according to an ingredient.

For example, when a grill mode is selected, the control unit 110 may operate one of the burner 141 and the hot wire 143 provided in an upper portion of the cooking chamber. When a bake mode is selected, the control unit 110 may operate one of the burner 141 and the hot wire 143 provided in a lower portion of the cooking chamber. Also, when a microwave mode is selected, the control unit 110 may operate the microwave generator 147. When a steam mode is selected, the control unit 110 may operate the steam generator 149.

Afterward, the cooking apparatus 100 detects a weight of the ingredient (operation 1430).

The control unit 110 of the cooking apparatus 100 may detect the weight of the ingredient contained in the cooking chamber based on an electric signal output by the weight sensor 135.

Afterward, the cooking apparatus 100 detects a gas inside the cooking chamber (operation 1440).

The control unit 110 of the cooking apparatus 100 may detect the gas inside the cooking chamber using the gas sensor 131. Specifically, the control unit 110 may determine the type and concentration of the gas inside the cooking chamber based on frequencies of electric signals output by the plurality of QCMs 131-1, 131-2, 131-3, and 131-4 included in the gas sensor 131.

For example, the control unit 110 may determine the presence and concentration of hydrogen sulfide based on the frequency of the electric signal output by the first QCM 131-1 and may determine the presence and concentration of ethylene based on the frequency of the electric signal output by the second QCM 131-2.

Afterward, the cooking apparatus 100 determines the type of the ingredient (operation 1450).

The control unit 110 of the cooking apparatus 100 may determine the type of the ingredient based on the type and concentration of the gas detected by the gas sensor 131. For example, the control unit 110 may determine whether the ingredient is meat, fish, fruit, a dairy product, or fermented food.

The ingredient generates gases of different types and concentrations according to the type of the ingredient. Since the types and concentrations of generated gases differ according to the type of the ingredient, the control unit 110 may determine the type of the ingredient depending on the type and concentration of the generated gas.

The types and concentrations of gases generated by the ingredient may be stored as a lookup table in advance in the memory 113 of the control unit 110. The control unit 110 may determine the type of the ingredient by referencing the lookup table in the memory 113.

Afterward, the cooking apparatus 100 determines the number of calories in the ingredient (operation 1460).

The control unit 110 of the cooking apparatus 100 may determine the number of calories in the ingredient based on the type and weight of the ingredient. The number of calories in the ingredient may be stored in the memory 113 by a designer in advance. Alternatively, the control unit 110 may search an external server for the number of calories in the ingredient through the communication unit 150.

Afterward, the cooking apparatus 100 may determine a menu for a next meal (operation 1470).

The control unit 110 of the cooking apparatus 100 may select the menu for the next meal based on the recommended daily number of calories and the number of calories in the ingredient. Specifically, based on a difference between the recommended daily number of calories and the number of calories in the ingredient, the menu for the next meal may be selected.

Also, the control unit 110 may determine nutrients contained in the ingredient based on the type of the ingredient and may select the menu for the next meal based on the nutrients of the ingredient. Specifically, a nutrient which the user lacks may be determined based on the nutrients of the ingredient and a menu corresponding to the nutrient which the user lacks may be selected.

Afterward, the cooking apparatus 100 informs the user of the menu for the next meal (operation 1480).

The control unit 110 of the cooking apparatus 100 may inform the user of the menu for the next meal using various methods.

For example, the control unit 110 may inform the user of the menu for the next meal through the user interface 120 included in the cooking apparatus 100.

As another example, the control unit 110 may transmit information on the menu for the next meal to the mobile terminal 210, the image display apparatus 220, the refrigerator 230, the audio output apparatus 240, the air conditioner 250, and the dishwasher 260 through the communication unit 150.

When the control unit 110 transmits the information on the menu for the next meal to the mobile terminal 210, as shown in FIG. 18, the mobile terminal 210 may display a menu display image 211*d* which indicates the menu for the next meal on the display 211. The user may receive a recommendation for the menu for the next meal through the menu display image 211*d* displayed on the mobile terminal 210.

Also, the control unit 110 may determine whether an ingredient for the menu for the next meal is stored in the refrigerator 230 through communication with the refrigerator 230. When the ingredient is not stored in the refrigerator 230, the control unit 110 may request a purchase of the ingredient for the menu for the next meal by the user.

The control unit 110 of the cooking apparatus 100 may transmit an ingredient purchase request to the user using various methods.

For example, the control unit 110 may transmit the ingredient purchase request to the user through the user interface 120 included in the cooking apparatus 100.

As another example, the control unit 110 may transmit the ingredient purchase request to the mobile terminal 210, the image display apparatus 220, the refrigerator 230, the audio output apparatus 240, the air conditioner 250, and the dishwasher 260 through the communication unit 150.

When the control unit 110 transmits the ingredient purchase request to the mobile terminal 210, as shown in FIG. 19, the mobile terminal 210 may display an ingredient purchase request image 211*e* which requests the purchase of the ingredient on the display 211.

The user may purchase the ingredient according to the ingredient purchase request image 211*e* displayed on the mobile terminal 210. When the user accepts the purchase of the ingredient, the mobile terminal 210 may connect to a shopping mall homepage to purchase the ingredient.

Also, the control unit 110 may inform the user about food intake based on the number of calories in the ingredient.

For example, the control unit 110 may inform the user of food intake through the user interface 120 included in the cooking apparatus 100.

As another example, the control unit 110 may transmit a food intake guide request to the mobile terminal 210, the image display apparatus 220, the refrigerator 230, the audio output apparatus 240, the air conditioner 250, and the dishwasher 260 through the communication unit 150.

When the control unit 110 transmits the food intake guide request to the mobile terminal 210, as shown in FIG. 20, the mobile terminal 210 may display a food intake guide image 211*f* which informs of food intake information on the display 211.

The user may select the menu for the next meal referring to the food intake guide image 211f displayed on the mobile terminal 210.

As described above, the cooking apparatus 100 may determine an ingredient based on the type and concentration of a gas inside the cooking chamber and may determine the number of calories to be consumed by the user based on the ingredient. Also, the cooking apparatus 100 may display information corresponding to the number of calories to be consumed by the user through various electronic apparatuses.

Figure 21:
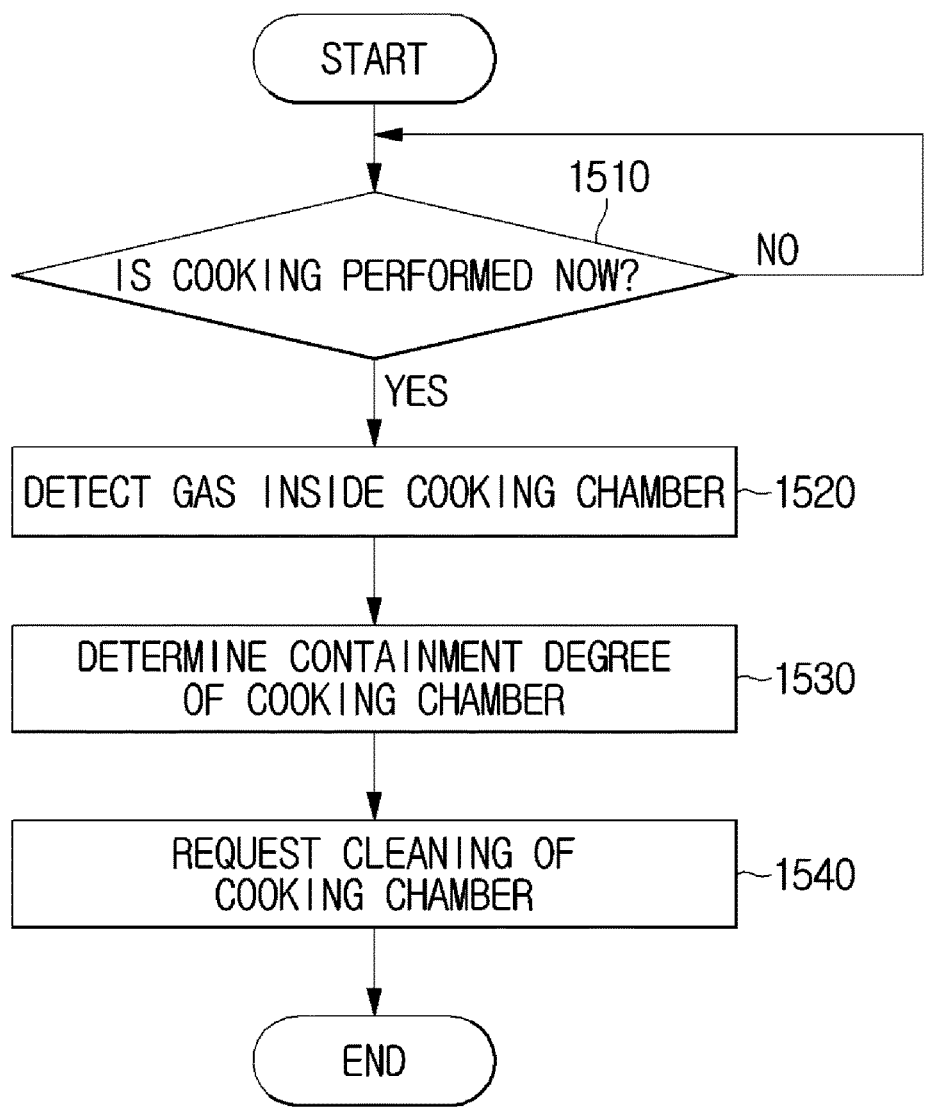
FIG. 21 illustrates yet another example of an operation of the cooking apparatus according to one embodiment of the disclosure.
Figure 22:
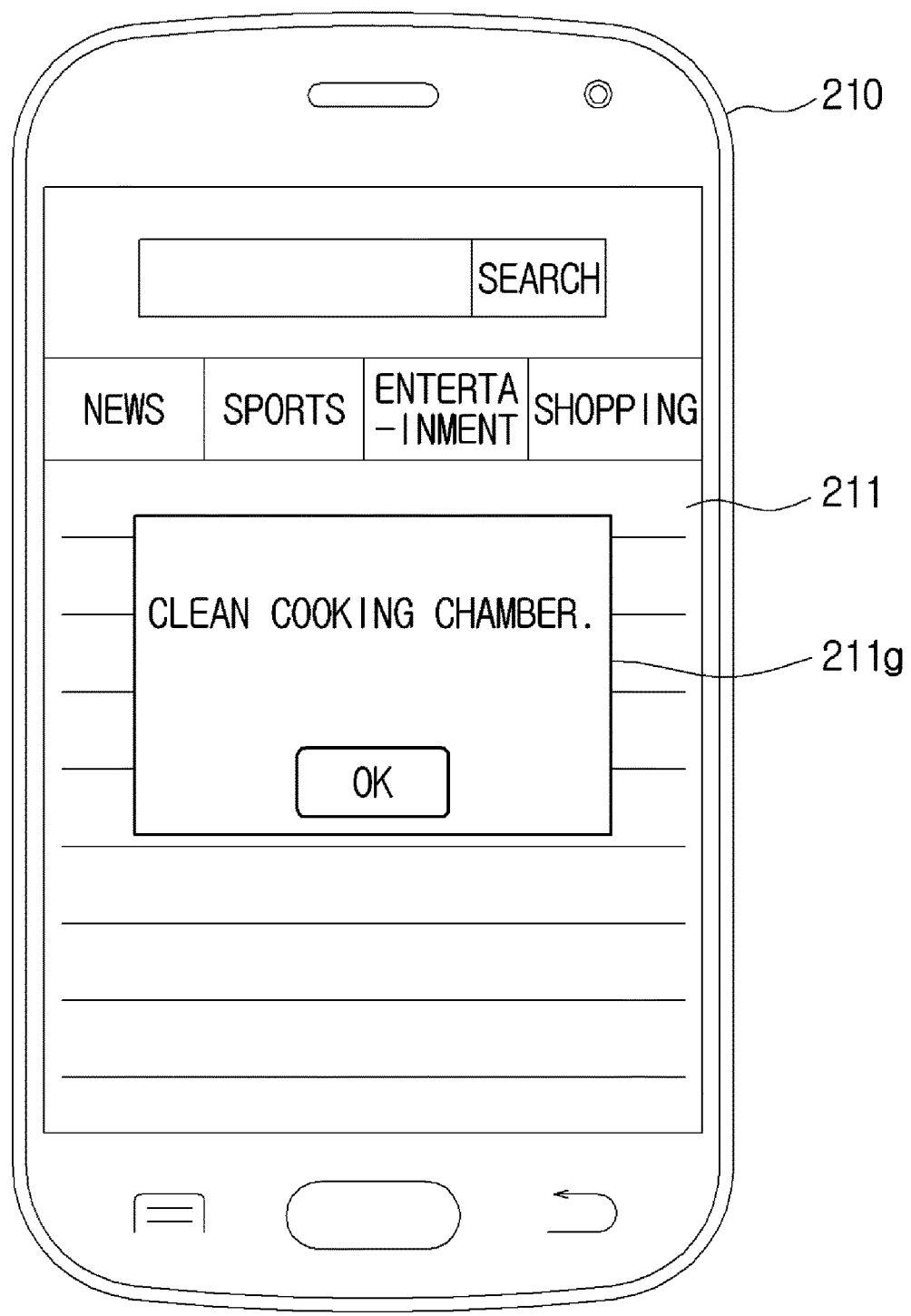
FIG. 22 illustrates an example of a screen displayed by an electronic apparatus which receives information on the degree of contamination of a cooking chamber according to the operation shown in FIG. 21.

FIG. 21 illustrates yet another example of an operation of the cooking apparatus 100 according to one embodiment of the disclosure. FIG. 22 illustrates an example of a screen displayed by an electronic apparatus which receives information on the degree of contamination of a cooking chamber according to the operation shown in FIG. 21.

The operation 1500 of the cooking apparatus 100 will be described with reference to FIGS. 21 and 22.

The cooking apparatus 100 determines whether an ingredient is being cooked (operation 1510).

The control unit 110 of the cooking apparatus 100 may store whether cooking is being performed in the memory 113. Specifically, when cooking of the ingredient starts, it may be stored in the memory 113 that cooking is being performed. When the cooking is completed, it may be stored in the memory 113 that the cooking has stopped. Afterward, the control unit 110 may determine whether the cooking is being performed, by referring to the memory 113.

Also, the control unit 110 may determine whether the ingredient is being cooked, based on a control signal output to the heating unit 140. Specifically, when an operation signal is output to the heating unit 140, the control unit 110 may determine that the cooking is being performed. When an operation stop signal is output to the heating unit 140, the control unit 110 may determine that the cooking is not being performed.

When it is determined that the cooking is performed (YES in operation 1510), the cooking apparatus 100 detects a gas inside the cooking chamber (operation 1520).

The control unit 110 of the cooking apparatus 100 may detect the gas inside the cooking chamber using the gas sensor 131. Specifically, the control unit 110 may determine the type and concentration of the gas inside the cooking chamber based on frequencies of electric signals output by the plurality of QCMs 131-1, 131-2, 131-3, and 131-4 included in the gas sensor 131.

For example, the control unit 110 may determine the presence and concentration of hydrogen sulfide based on the frequency of the electric signal output by the first QCM 131-1 and may determine the presence and concentration of ethylene based on the frequency of the electric signal output by the second QCM 131-2.

Afterward, the cooking apparatus 100 detects a degree of contamination inside the cooking chamber (operation 1530).

The control unit 110 of the cooking apparatus 100 may determine the degree of contamination inside the cooking chamber based on the concentration of the gas inside the cooking chamber. For example, when the concentration of the gas inside the cooking chamber is higher than a reference value, the control unit 110 may determine that the degree of contamination inside the cooking chamber is high. When the concentration of the gas inside the cooking chamber is equal to or lower than the reference value, the control unit 110 may determine that the degree of contamination inside the cooking chamber is low.

Afterward, the cooking apparatus 100 requests cleaning of the cooking chamber from the user depending on the degree of contamination inside the cooking chamber (operation 1540).

The control unit 110 of the cooking apparatus 100 may request the cleaning of the cooking chamber by the user when the concentration of the gas inside the cooking chamber is higher than the reference value.

The control unit 110 may request the cleaning of the cooking chamber by the user using various methods.

For example, the control unit 110 may request the cleaning of the cooking chamber by the user through the user interface 120 included in the cooking apparatus 100.

As another example, the control unit 110 may transmit a cooking chamber cleaning request to the mobile terminal 210, the image display apparatus 220, the refrigerator 230, the audio output apparatus 240, the air conditioner 250, and the dishwasher 260 through the communication unit 150.

When the control unit 110 transmits the cooking chamber cleaning request to the mobile terminal 210, as shown in FIG. 22, the mobile terminal 210 may display a cooking chamber cleaning request image 211g which indicates the cooking chamber cleaning request on the display 211.

The user may check the cooking chamber cleaning request image 211g displayed on the mobile terminal 210 and may clean the cooking chamber of the cooking apparatus 100.

As described above, the cooking apparatus 100 may determine the degree of contamination of the cooking chamber based on the type and concentration of the gas inside the cooking chamber and may request the cleaning of the cooking chamber by the user depending on the degree of contamination of the cooking chamber.

Figure 23:
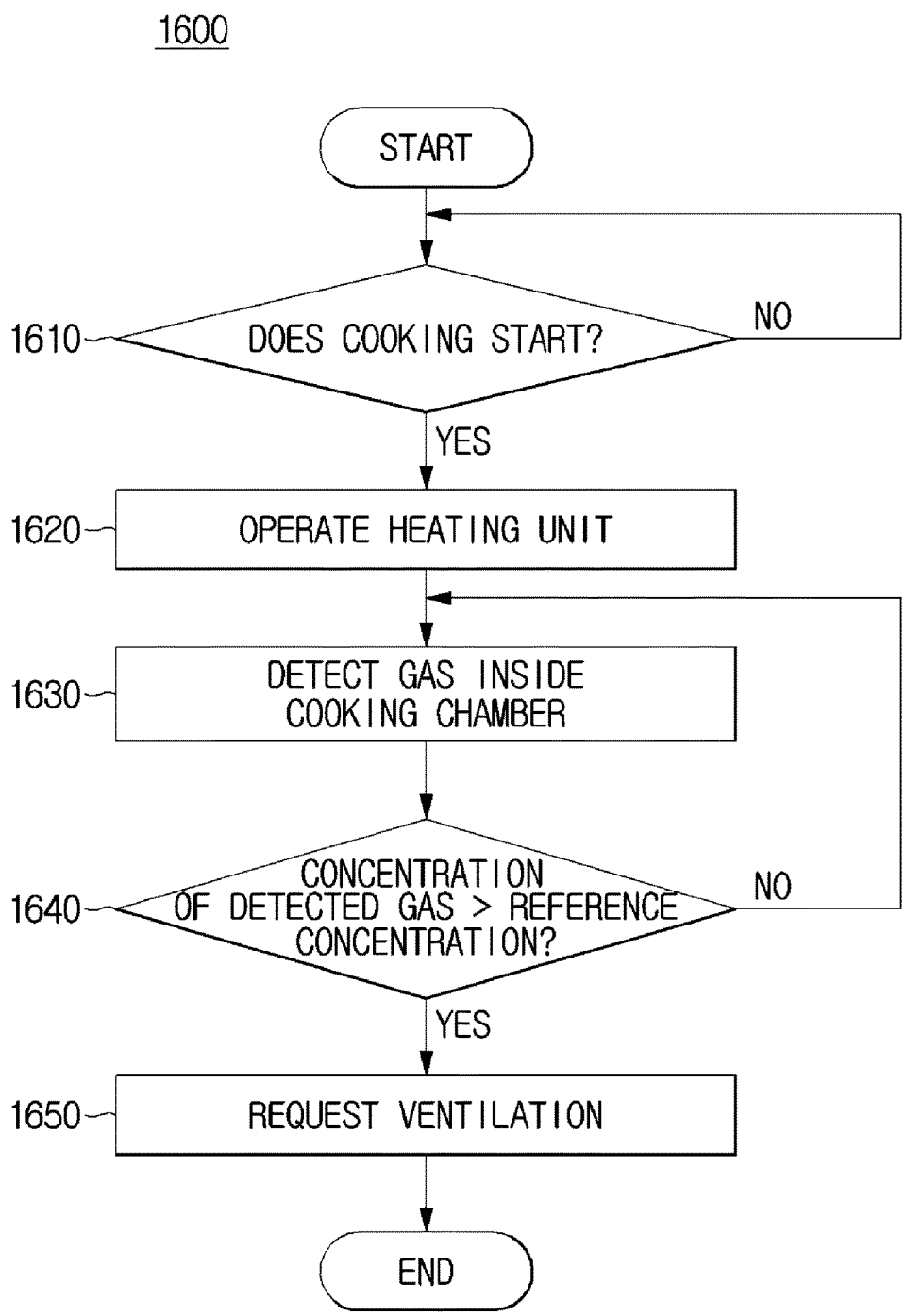
FIG. 23 illustrates yet another example of the operation of the cooking apparatus according to one embodiment of the disclosure.
Figure 24:
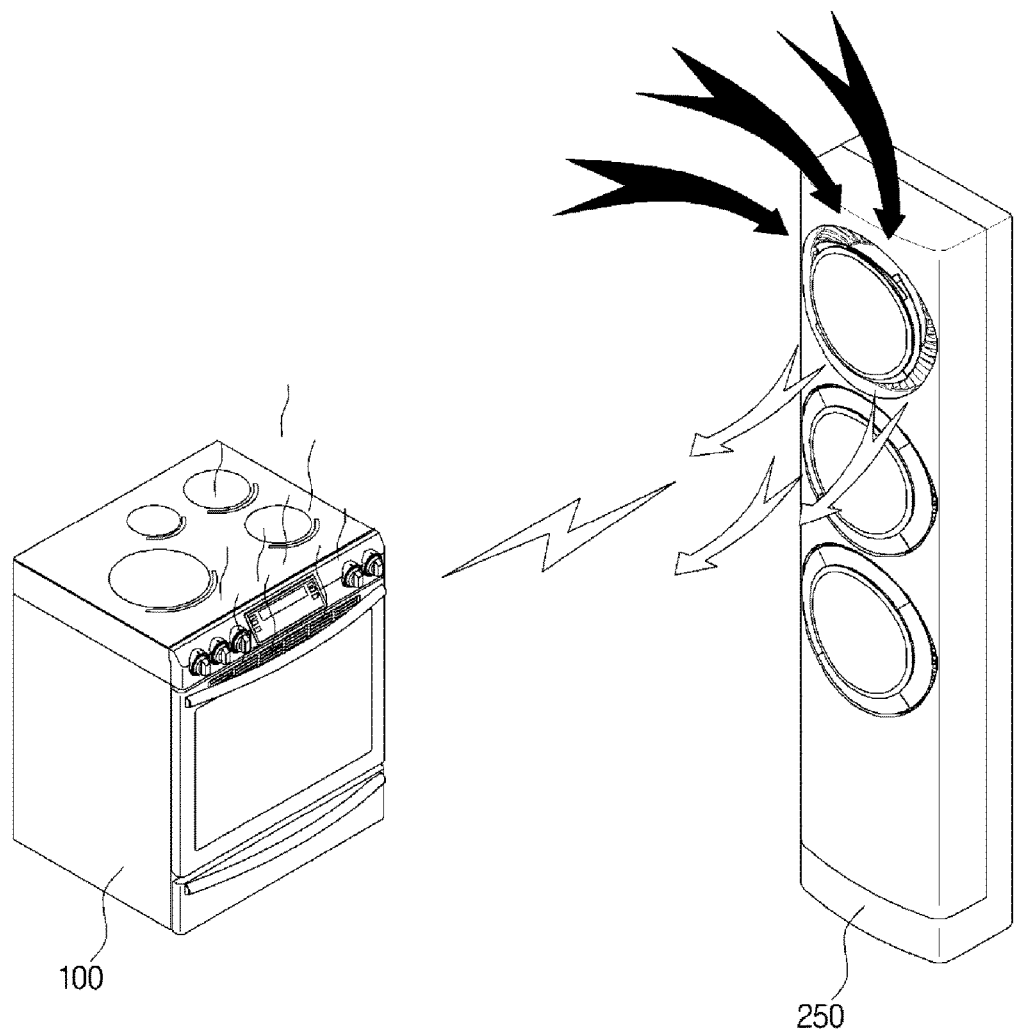
FIG. 24 illustrates an operation of an electronic apparatus according to the operation shown in FIG. 23.

FIG. 23 illustrates yet another example of the operation of the cooking apparatus 100 according to one embodiment of the disclosure. FIG. 24 illustrates an operation of an electronic apparatus according to the operation shown in FIG. 23.

The operation 1600 of the cooking apparatus 100 will be described with reference to FIGS. 23 and 24.

The cooking apparatus 100 determines whether to start cooking (operation 1610).

The control unit 110 of the cooking apparatus 100 may determine whether to perform cooking, depending on a control command input from the user through the user interface 120. For example, when the user inputs a cooking start command through the user interface 120, the control unit 110 starts cooking.

When it is determined to start the cooking (YES in operation 1610), the cooking apparatus 100 operates the heating unit 140 (operation 1620).

The control unit 110 of the cooking apparatus 100 may operate the heating unit 140 according to a cooking mode input by the user or a cooking mode selected according to an ingredient.

For example, when a grill mode is selected, the control unit 110 may operate one of the burner 141 and the hot wire 143 provided in an upper portion of the cooking chamber. When a bake mode is selected, the control unit 110 may operate one of the burner 141 and the hot wire 143 provided in a lower portion of the cooking chamber. Also, when a microwave mode is selected, the control unit 110 may operate the microwave generator 147. When a steam mode is selected, the control unit 110 may operate the steam generator 149.

Afterward, the cooking apparatus 100 detects a gas inside the cooking chamber (operation 1630).

The control unit 110 of the cooking apparatus 100 may detect the gas inside the cooking chamber using the gas sensor 131. Specifically, the control unit 110 may determine the type and concentration of the gas inside the cooking chamber based on frequencies of electric signals output by the plurality of QCMs 131-1, 131-2, 131-3, and 131-4 included in the gas sensor 131.

For example, the control unit 110 may determine the presence and concentration of hydrogen sulfide based on the frequency of the electric signal output by the first QCM 131-1 and may determine the presence and concentration of ethylene based on the frequency of the electric signal output by the second QCM 131-2.

Afterward, the cooking apparatus 100 determines whether the concentration of the gas inside the cooking chamber is higher than a reference concentration (operation 1640).

The control unit 110 of the cooking apparatus 100 may compare the concentration of the gas inside the cooking chamber with the reference concentration and may determine whether the concentration of the gas inside the cooking chamber is higher than the reference concentration.

When the concentration of the gas inside the cooking chamber is not higher than the reference concentration (NO in operation 1640), the cooking apparatus 100 repetitively performs the detecting of the concentration of the gas inside the cooking chamber (operation 1630) and the comparing the concentration of the gas with the reference concentration (operation 1640).

When the concentration of the gas inside the cooking chamber is higher than the reference concentration (YES in operation 1640), the cooking apparatus 100 requests ventilation by the air conditioner 250 (operation 1650).

The control unit 110 of the cooking apparatus 100, as shown in FIG. 24, may request the ventilation by the air conditioner 250 through the communication unit 150.

The air conditioner 250 which receives a ventilation request from the cooking apparatus 100 may perform the ventilation to reduce the concentration of the gas as shown in FIG. 24.

Figure 25:
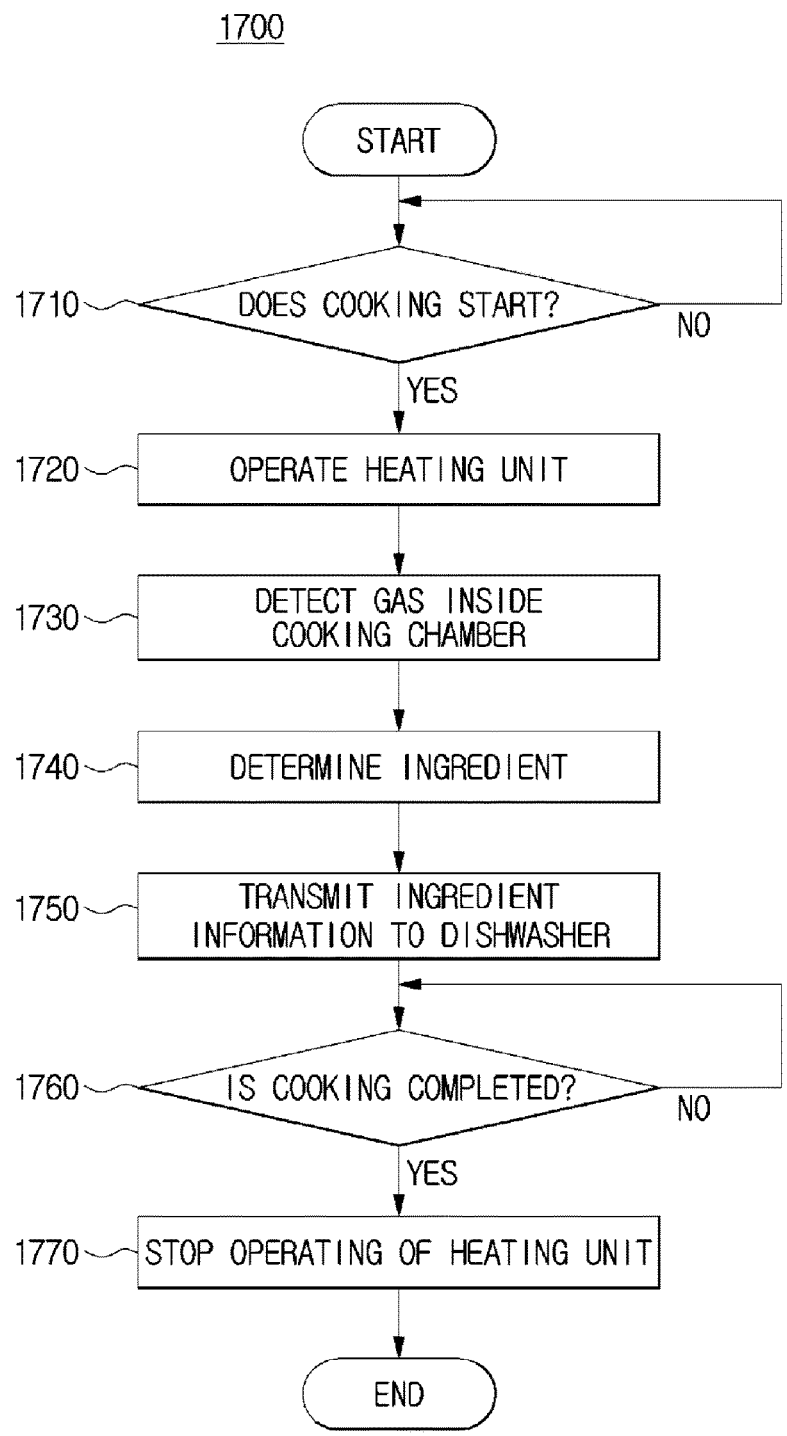
FIGS. 25 and 26 illustrate an example of an interworking operation between the cooking apparatus and an electronic apparatus according to one embodiment of the disclosure.
Figure 26:
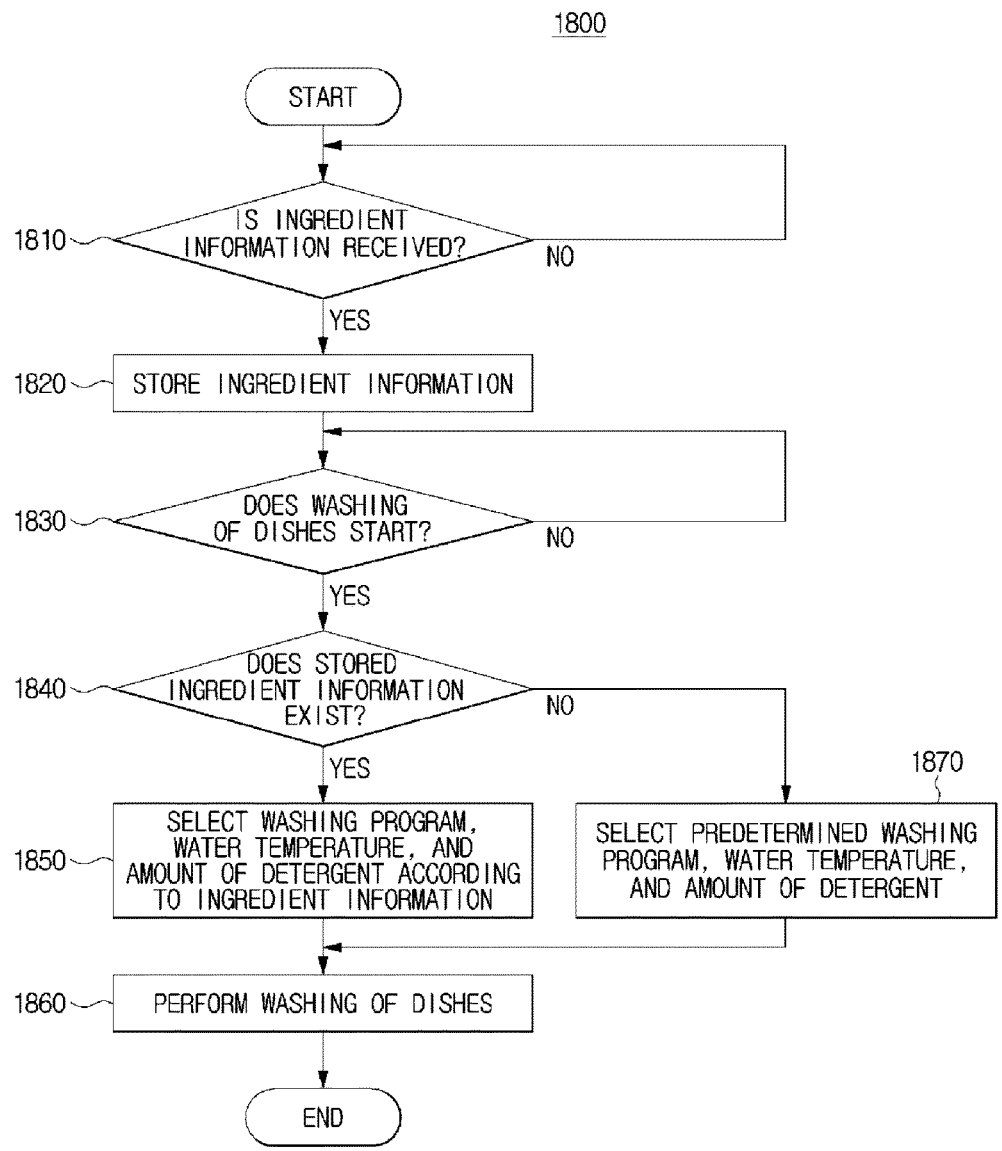

FIGS. 25 and 26 illustrate an example of an interworking operation between the cooking apparatus 100 and an electronic apparatus according to one embodiment of the disclosure.

The interworking operation 1700 between the cooking apparatus 100 and the electronic apparatus will be described with reference to FIGS. 25 to 26.

Referring to FIG. 25, the cooking apparatus 100 determines whether to perform cooking (operation 1710).

The control unit 110 of the cooking apparatus 100 may determine whether to perform cooking, depending on a control command input from the user through the user interface 120. For example, when the user inputs a cooking start command through the user interface 120, the control unit 110 may start cooking.

When it is determined to start the cooking (YES in operation 1710), the cooking apparatus 100 operates the heating unit 140 (operation 1720).

The control unit 110 of the cooking apparatus 100 may operate the heating unit 140 according to a cooking mode input by the user or a cooking mode selected according to an ingredient.

For example, when a grill mode is selected, the control unit 110 may operate one of the burner 141 and the hot wire 143 provided in an upper portion of the cooking chamber. When a bake mode is selected, the control unit 110 may operate one of the burner 141 and the hot wire 143 provided in a lower portion of the cooking chamber. Also, when a microwave mode is selected, the control unit 110 may operate the microwave generator 147. When a steam mode is selected, the control unit 110 may operate the steam generator 149.

Afterward, the cooking apparatus 100 detects a gas inside the cooking chamber (operation 1730).

The control unit 110 of the cooking apparatus 100 may detect the gas inside the cooking chamber using the gas sensor 131. Specifically, the control unit 110 may determine the type and concentration of the gas inside the cooking chamber based on frequencies of electric signals output by the plurality of QCMs 131-1, 131-2, 131-3, and 131-4 included in the gas sensor 131.

For example, the control unit 110 may determine the presence and concentration of hydrogen sulfide based on the frequency of the electric signal output by the first QCM 131-1 and may determine the presence and concentration of ethylene based on the frequency of the electric signal output by the second QCM 131-2.

Afterward, the cooking apparatus 100 determines the type of the ingredient (operation 1740).

The control unit 110 of the cooking apparatus 100 may determine the type of the ingredient based on the type and concentration of the gas detected by the gas sensor 131. For example, the control unit 110 may determine whether the ingredient is meat, fish, fruit, a dairy product, or fermented food.

The ingredient generates gases of different types and concentrations according to the type of the ingredient. Since the types and concentrations of generated gases differ according to the type of the ingredient, the control unit 110 may determine the type of the ingredient depending on the type and concentration of the generated gas.

The types and concentrations of gases generated by the ingredient may be stored as a lookup table in advance in the memory 113 of the control unit 110. The control unit 110 may determine the type of the ingredient by referencing the lookup table in the memory 113.

Afterward, the cooking apparatus 100 transmits ingredient information to the dishwasher 260 (operation 1750).

The control unit 110 of the cooking apparatus 100 may transmit the ingredient information including the type and weight of the ingredient to the dishwasher 260 through the communication unit 150. As described below, the dishwasher 260 which receives the ingredient information from the cooking apparatus 100 may determine a washing program, a water temperature, and an amount of detergent according to the ingredient information.

Afterward, the cooking apparatus 100 determines whether cooking of the ingredient is completed (operation 1760).

The cooking apparatus 100 may determine whether a cooking time is equal to an input cooking time input by the user or whether the cooking time is equal to a set cooking time set by the cooking apparatus 100.

Also, the cooking apparatus 100 may determine whether the cooking of the ingredient is completed, based on the type and concentration of the gas inside the cooking chamber.

When it is determined that cooking is completed (YES in operation 1760), the cooking apparatus 100 stops the operating of the heating unit 140 (operation 1770).

Also, referring to FIG. 26, the dishwasher 260 determines whether the ingredient information is received from the cooking apparatus 100 (operation 1810).

As described above, the cooking apparatus 100 may determine the type of the ingredient based on a detection result of the gas sensor 131 and may transmit the ingredient information including the type of the ingredient to the dishwasher 260. Also, the dishwasher 260 may receive the ingredient information transmitted from the cooking apparatus 100.

When the ingredient information is received (YES in operation 1810), the dishwasher 260 stores the ingredient information (operation 1820).

The dishwasher 260 may extract the type of the ingredient from the ingredient information received from the cooking apparatus 100 and may store the extracted information on the ingredient in a memory (not shown). Also, the dishwasher 260 may store data which indicates that the ingredient information is received in the memory.

After the ingredient information is stored, the dishwasher 260 determines whether to perform washing dishes (operation 1830).

The dishwasher 260 may determine whether to perform the washing of dishes depending on a control command input by the user. For example, when the user inputs a washing start command, the dishwasher 260 may start the washing of dishes.

When it is determined to start the washing of dishes (YES in operation 1830), the dishwasher 260 determines whether the ingredient information is stored (operation 1840).

The dishwasher 260 may determine whether the ingredient information is stored in the memory thereof, by searching the memory. Also, the dishwasher 260 may determine whether the ingredient information is stored in the memory by searching for the data which indicates that the ingredient information has been received.

When the ingredient information is stored (YES in operation 1840), the dishwasher 260 selects the washing program, the water temperature, and the amount of detergent according to the ingredient information (operation 1850).

Specifically, the dishwasher 260 may select the washing program, the water temperature, and the amount of detergent according to the type of the ingredient.

For example, when the ingredient is meat, a large amount of fat may be attached to a dish which contains the meat. To reduce the fat, the dishwasher 260 may select a washing program for removing fat and may increase a water temperature. Also, the dishwasher 260 may increase an amount of detergent and may increase a rinsing time.

Also, when the ingredient is a vegetable, a dish which contains the vegetable is not attached with a large amount of contaminants. Accordingly, the dishwasher 260 may select a washing program and may lower a water temperature so as to rinse the dish. Also, the dishwasher 260 may decrease an amount of detergent and may reduce a rinsing time.

Afterward, the dishwasher 260 performs the washing of dishes according to the selected washing program, water temperature, and amount of detergent (operation 1860).

When the ingredient information is not stored (NO in operation 1840), the dishwasher 260 selects a predetermined washing program, water temperature, and amount of detergent (operation 1870).

The dishwasher 260 may select a washing program, water temperature, and amount of detergent to wash a dish contaminated with an average degree of contamination.

Afterward, the dishwasher 260 performs the washing of dishes according to the selected washing program, water temperature, and amount of detergent (operation 1860).

As described above, the cooking apparatus 100 may determine the type of an ingredient while cooking the ingredient and may transmit ingredient information including the determined type of the ingredient to the dishwasher 260. The dishwasher 260 which receives the ingredient information from the cooking apparatus 100 may increase the efficiency in washing of dishes by controlling a washing program, water temperature, and amount of detergent according to the type of the ingredient included in the ingredient information.

Figure 27:
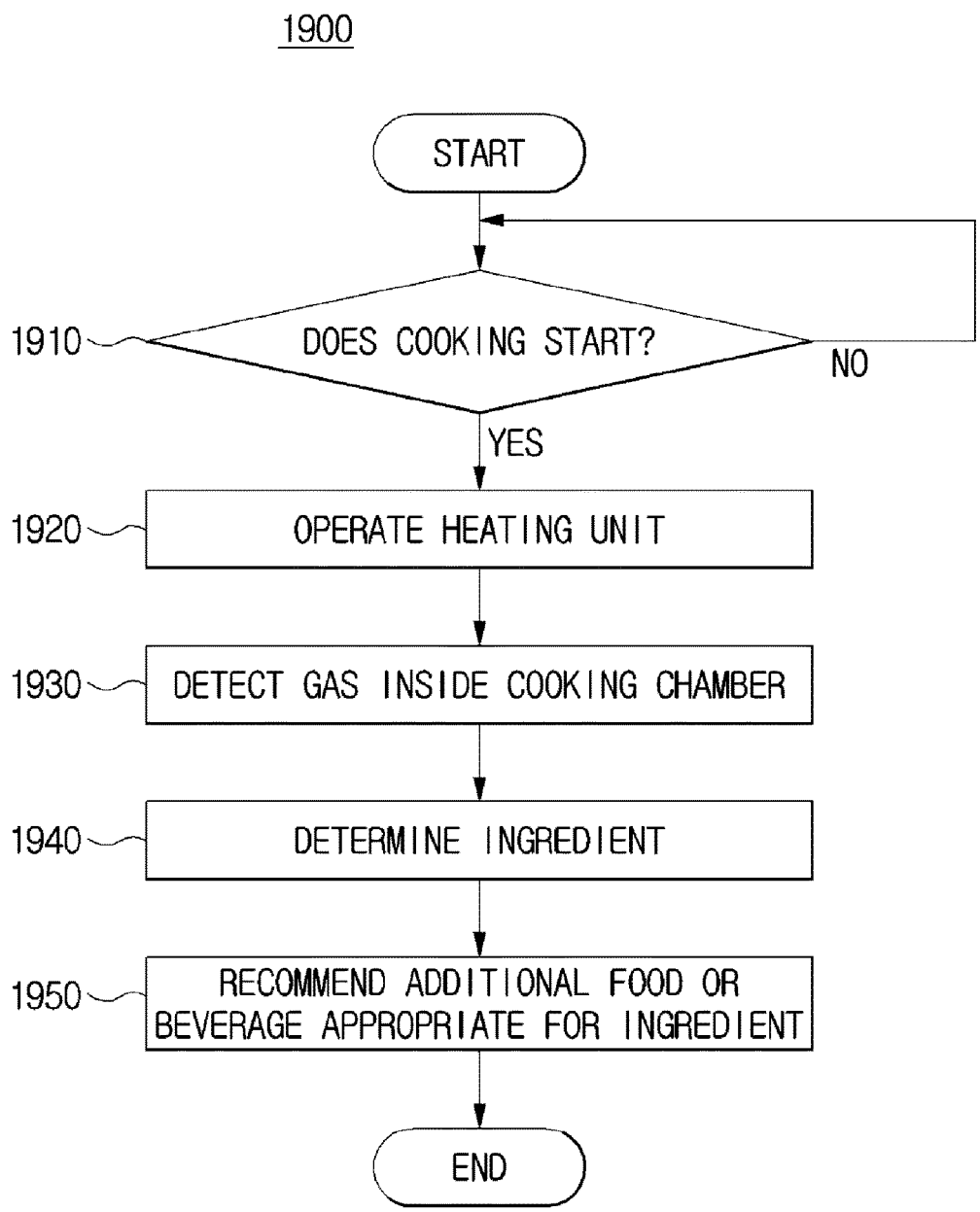
FIG. 27 illustrates yet another example of the operation of the cooking apparatus according to one embodiment of the disclosure.
Figure 28:
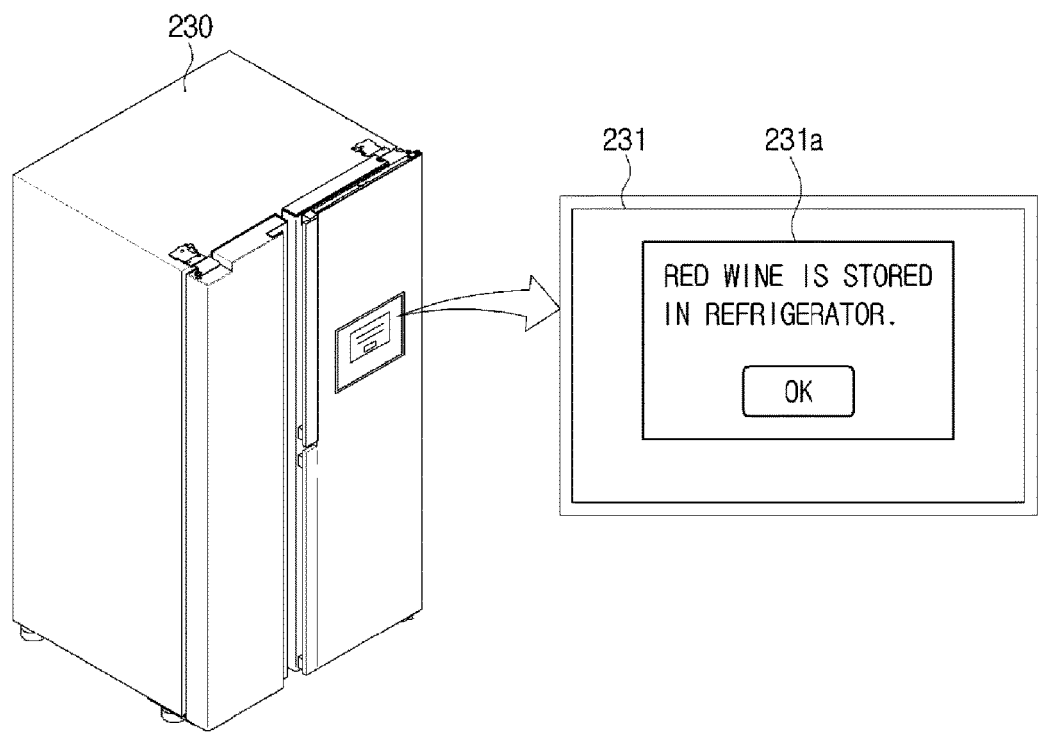
FIG. 28 illustrates an operation of an electronic apparatus according to the operation shown in FIG. 27.

FIG. 27 illustrates yet another example of the operation of the cooking apparatus 100 according to one embodiment of the disclosure. FIG. 28 illustrates an operation of an electronic apparatus according to the operation shown in FIG. 27.

The operation 1900 of the cooking apparatus 100 will be described with reference to FIGS. 27 to 28.

The cooking apparatus 100 determines whether to perform cooking (operation 1910).

The control unit 110 of the cooking apparatus 100 may determine whether to perform cooking, depending on a control command input from the user through the user interface 120. For example, when the user inputs a cooking start command through the user interface 120, the control unit 110 may start cooking.

When it is determined to start the cooking (YES in operation 1910), the cooking apparatus 100 operates the heating unit 140 (operation 1920).

The control unit 110 of the cooking apparatus 100 may operate the heating unit 140 according to a cooking mode input by the user or a cooking mode selected according to an ingredient.

For example, when a grill mode is selected, the control unit 110 may operate one of the burner 141 and the hot wire 143 provided in an upper portion of the cooking chamber. When a bake mode is selected, the control unit 110 may operate one of the burner 141 and the hot wire 143 provided in a lower portion of the cooking chamber. Also, when a microwave mode is selected, the control unit 110 may operate the microwave generator 147. When a steam mode is selected, the control unit 110 may operate the steam generator 149.

Afterward, the cooking apparatus 100 detects a gas inside the cooking chamber (operation 1930).

The control unit 110 of the cooking apparatus 100 may detect the gas inside the cooking chamber using the gas sensor 131. Specifically, the control unit 110 may determine the type and concentration of the gas inside the cooking chamber based on frequencies of electric signals output by the plurality of QCMs 131-1, 131-2, 131-3, and 131-4 included in the gas sensor 131.

For example, the control unit 110 may determine the presence and concentration of hydrogen sulfide based on the frequency of the electric signal output by the first QCM 131-1 and may determine the presence and concentration of ethylene based on the frequency of the electric signal output by the second QCM 131-2.

Afterward, the cooking apparatus 100 determines the type of the ingredient (operation 1940).

The control unit 110 of the cooking apparatus 100 may determine the type of the ingredient based on the type and concentration of the gas detected by the gas sensor 131. For example, the control unit 110 may determine whether the ingredient is meat, fish, fruit, a dairy product, or fermented food.

The ingredient generates gases of different types and concentrations according to the type of the ingredient. Since the types and concentrations of generated gases differ according to the type of the ingredient, the control unit 110 may determine the type of the ingredient depending on the type and concentration of the generated gas.

The types and concentrations of gases generated by the ingredient may be stored as a lookup table in advance in the memory 113 of the control unit 110. The control unit 110 may determine the type of the ingredient by referencing the lookup table in the memory 113.

Afterward, the cooking apparatus 100 informs of additional food or beverages appropriate for the determined ingredient (operation 1950).

The control unit 110 of the cooking apparatus 100 may determine the additional food or beverages appropriate for the determined ingredient. For example, when the ingredient is meat, vegetables which help to break down the fat in the meat may be consumed together with the meat. Also, it is known that red wine is appropriate for meat. Also, when the ingredient is fish, it is known that white wine is appropriate for fish.

The cooking apparatus 100 may inform the user of the additional food or beverages using various methods.

For example, the control unit 110 may inform the user of the additional food or beverages through the user interface 120 included in the cooking apparatus 100.

As another example, the control unit 110 may transmit information on the additional food or beverages to the mobile terminal 210, the image display apparatus 220, the refrigerator 230, the audio output apparatus 240, the air conditioner 250, and the dishwasher 260 through the communication unit 150.

When the control unit 110 transmits the information on the additional food or beverages to the refrigerator 230, as shown in FIG. 28, the refrigerator 230 may display an additional menu display image 231b which indicates the additional food or beverages on a display 231. Also, the refrigerator 230 may display a storage box in which the additional food or beverages are stored, in the additional menu display image 231b.

As described above, the cooking apparatus 100 may determine an ingredient based on the type and concentration of a gas inside the cooking chamber and may determine the additional food or beverages. Also, the cooking apparatus 100 may inform the user of the additional food or beverages through various electronic apparatuses.

In the above description, the cooking apparatus 100 using the gas sensor 131 has been described.

Hereinafter, a gas detection apparatus 300 which detects a gas generated by an ingredient will be described.

Figure 29:
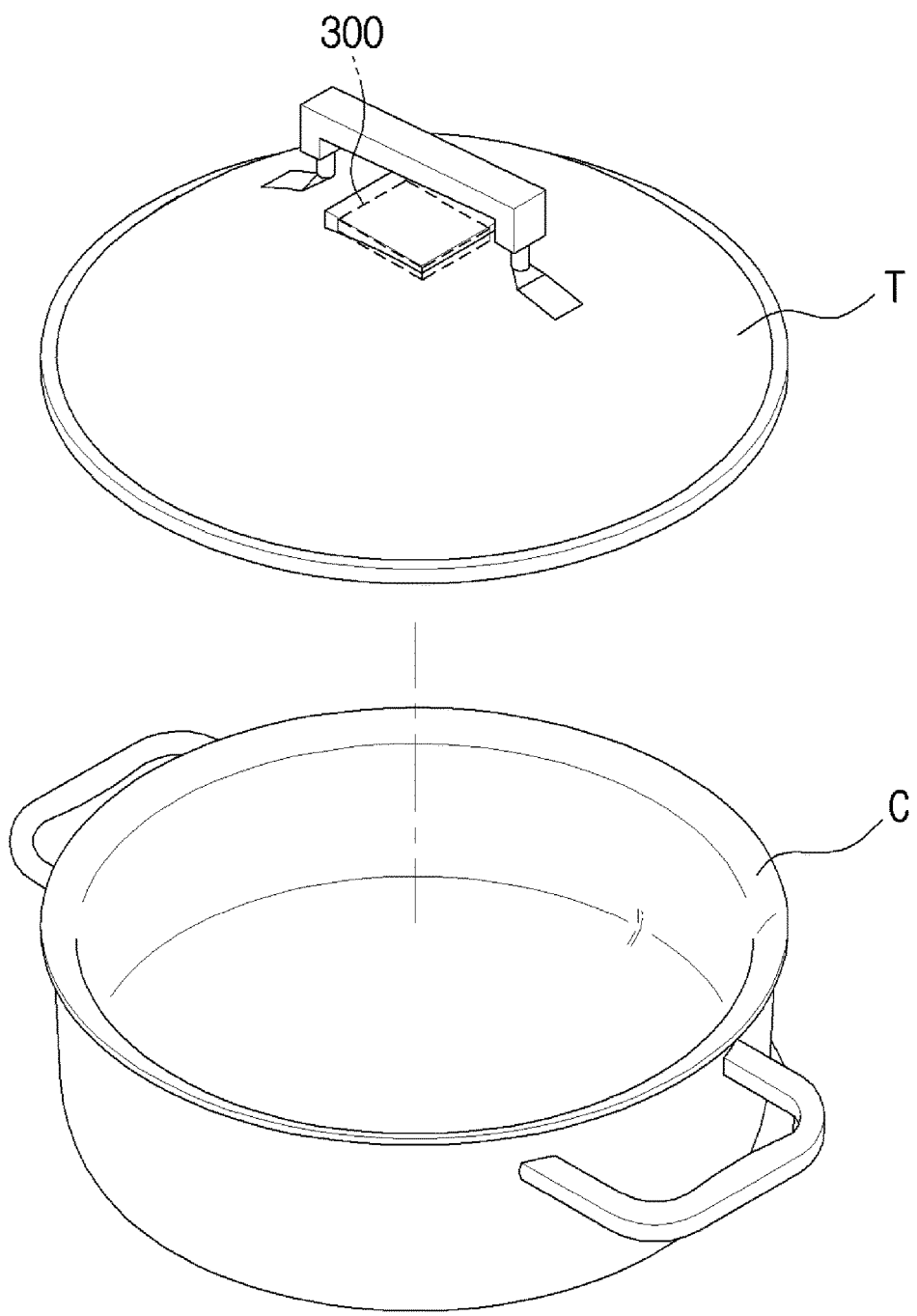
FIG. 29 illustrates a gas detection apparatus attached to a cooking container according to one embodiment of the disclosure.
Figure 30:
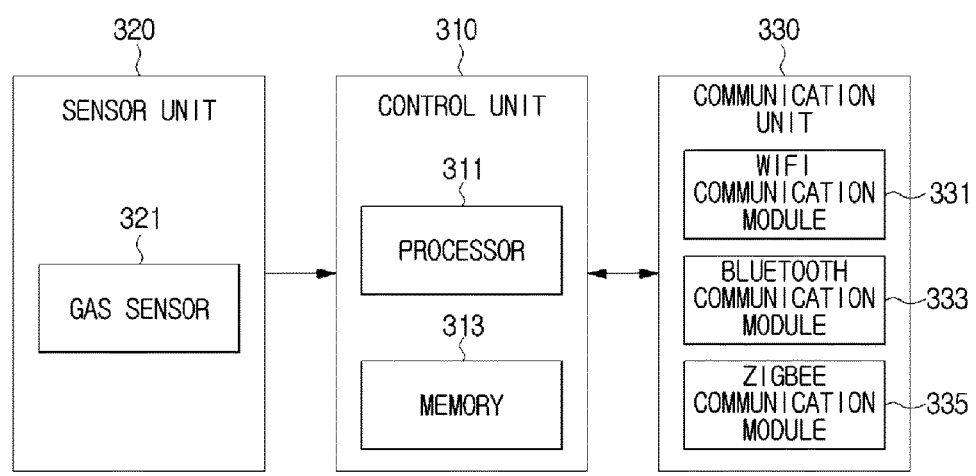
FIG. 30 is a configuration diagram of the gas detection apparatus according to one embodiment of the disclosure.

FIG. 29 illustrates the gas detection apparatus 300 attached to a cooking container according to one embodiment of the disclosure. FIG. 30 is a configuration diagram of the gas detection apparatus 300 according to one embodiment of the disclosure.

The gas detection apparatus 300 detects a gas generated by an ingredient and determines the type and concentration of the gas. Also, the gas detection apparatus 300 may determine the type of the ingredient and a degree of progress in cooking of the ingredient based on the type and concentration of the gas generated by the ingredient.

Also, to detect the gas generated by the ingredient, the gas detection apparatus 300, as shown in FIG. 29, may be installed in a lid T of the cooking container C which contains the ingredient. As a result, the gas detection apparatus 300 may exactly detect the type and concentration of the gas generated by the ingredient.

Also, the gas detection apparatus 300 may communicate with various electronic apparatuses such as a mobile terminal, an image display apparatus, a refrigerator, an audio output apparatus, and an air conditioner. Specifically, the gas detection apparatus 300 may transmit cooking progress information which indicates the degree of progress in cooking of the ingredient to various electronic apparatuses such as a mobile terminal, an image display apparatus, a refrigerator, an audio output apparatus, and an air conditioner.

The mobile terminal, image display apparatus, refrigerator, audio output apparatus, and air conditioner, which receive the cooking progress information, may provide the user with the cooking progress information through various methods such as images, audio, vibration, and oscillation.

Also, the gas detection apparatus 300 may determine the ingredient according to the detected type and concentration of the gas and may determine an optimal cooking mode, cooking time, and cooking temperature for the ingredient. Also, the gas detection apparatus 300 may transmit cooking-related information which includes the determined cooking mode, cooking time, and cooking temperature to the mobile terminal, the image display apparatus, the refrigerator, the audio output apparatus, and the air conditioner through communication.

The mobile terminal, image display apparatus, refrigerator, audio output apparatus, and air conditioner, which receive the cooking-related information, may inform the user of the cooking mode, cooking time, and cooking temperature through various methods such as images, audio, vibration and oscillation.

Referring to FIG. 30, the gas detection apparatus 300 includes a sensor unit 320 which collects information on an ingredient, a communication unit 330 which communicates with an external electronic apparatus, and a control unit 310 which controls the gas detection apparatus 300.

The sensor unit 320 includes a gas sensor 321 which detects a gas generated by the ingredient.

The gas sensor 321 detects the type and concentration of the gas generated by the ingredient.

The gas sensor 321 described above may include a semiconductor-type gas sensor which determines the type and concentration of a gas using a change in electrical conductivity occurring when gas particles contact a surface thereof and a QCM which determines the type and concentration of a gas using a piezoelectric effect.

The communication unit 330 may include communication modules 331, 333, and 335 which communicate with an external electronic apparatus through various communication standards.

For example, the communication unit 330 may include a WiFi communication module 331 which accesses a LAN, a Bluetooth communication module 333 which communicates with an external device one by one or one to many, and a Zigbee communication module 335 generally used for a home network.

However, the communication unit 330 need not include all of the WiFi communication module 331, the Bluetooth communication module 333, and the Zigbee communication module 335. The communication unit 330, as necessary, may include at least one of the WiFi communication module 331, the Bluetooth communication module 333, and the Zigbee communication module 335.

The control unit 310 may include a memory 313 which stores a program and data for controlling the gas detection apparatus 300 and a processor 311 which processes the data according to the program stored in the memory 313.

The memory 313 may store a control program and control data for controlling the gas detection apparatus 300 or may store the type and concentration of a gas detected by the sensor unit 320 and a control signal output by the processor 311.

The memory 313 may include a volatile memory (not shown), such as an SRAM, a DRAM, etc., and a nonvolatile memory (not shown) such as a flash memory, an ROM, an EPROM, an EEPROM, etc.

The processor 311 processes the type and concentration of the gas according to the control program and control data stored in the memory 313 and may output a communication signal to communicate with an external electronic apparatus.

For example, the processor 311 may determine the type of the ingredient, nutrients included in the ingredient, the number of calories in the ingredient, and a degree of cooking the ingredient based on the type and concentration of the gas detected by the gas sensor 321 and may generate the cooking progress information and the cooking-related information to be transmitted to an external electronic apparatus.

In the above description, the processor 311 and the memory 313 have been separately described but the processor 311 and the memory 313 are not limited thereto and may be formed as a single chip.

As described above, the control unit 310 may control operations of all types of components included in the gas detection apparatus 300. Also, it will be understood that the operation of the gas detection apparatus 300 may be performed according to a control operation of the control unit 310.

The gas detection apparatus 300, like the cooking apparatus 100 described above, may determine the type and concentration of the gas generated by the ingredient. Also, the gas detection apparatus 300 may determine the type of the ingredient and the degree of progress in cooking of the ingredient based on the type and concentration of the gas.

Also, the gas detection apparatus 300 may generate the cooking progress information which indicates the degree of progress in cooking of the ingredient and may transmit the cooking progress information to an external electronic apparatus such as a mobile terminal, an image display apparatus, and a refrigerator to display the cooking progress information to the user.

Specifically, the gas detection apparatus 300 may determine whether cooking is completed depending on the degree of progress in cooking and may transmit a cooking completion message to the external electronic apparatus to inform the user of cooking completion when the cooking is completed.

Also, the gas detection apparatus 300 may determine a point in time that the cooking is completed depending on the degree of progress in cooking and may transmit information on a remaining cooking time to the external electronic apparatus to inform the user of the remaining cooking time.

Also, the gas detection apparatus 300 may request ventilation by the air conditioner depending on the concentration of the gas generated by the ingredient.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A cooking apparatus comprising:
   a heater configured to heat an ingredient in a cooking chamber of the cooking apparatus;
   a gas sensor configured to detect a gas generated by the ingredient inside the cooking chamber;
   a communication device configured to communicate with an external apparatus; and
   a controller configured to:
   determine at least one of a type of the gas and a concentration of the gas detected by the gas sensor based on a change in a resonant frequency of a component of the gas sensor,
   determine a cooking progress state of an ingredient in the cooking chamber of the cooking apparatus based on the determined at least one of the type of the gas and the concentration of the gas detected by the gas sensor, and
   transmit information on the determined cooking progress state to the external apparatus through the communication device to inform a user of the cooking progress state of the ingredient.

2. The cooking apparatus of claim 1, wherein the controller determines at least one of the cooking progress state of the ingredient and a type of the ingredient based on the determined at least one of the type of the gas and the concentration of the gas detected by the gas sensor.

3. The cooking apparatus of claim 2, wherein the controller determines at least one of a cooking mode, a cooking time, and a cooking temperature according to the determined type of the ingredient.

4. The cooking apparatus of claim 2, wherein the controller transmits information to the external apparatus through the communication device about a food item for a next meal according to the determined type of the ingredient to inform the user of the food item for the next meal.

5. The cooking apparatus of claim 2, wherein the controller transmits information to the external apparatus through the communication device about an additional food item according to the determined type of the ingredient to inform the user of the additional food item.

6. The cooking apparatus of claim 2, wherein the controller transmits ingredient information including the determined type of the ingredient to an external dishwasher to allow the external dishwasher to control a washing program based on the determined type of the ingredient.

7. The cooking apparatus of claim 1, wherein the controller determines whether cooking of the ingredient is completed based on the type of the gas and the concentration of the gas detected by the gas sensor and transmits a cooking completion display request to the external apparatus through the communication device to inform the user that the cooking is completed.

8. The cooking apparatus of claim 1, wherein the controller determines a cooking completion time of the ingredient based on at least one of the type of the gas and the concentration of the gas detected by the gas sensor and transmits information on the cooking completion time to the external apparatus through the communication device to inform the user of the cooking completion time.

9. The cooking apparatus of claim 1, wherein the controller transmits a ventilation request message to an external air conditioner through the communication device when the concentration of the gas detected by the gas sensor is higher than a reference value.

10. A gas detection apparatus comprising:
    a gas sensor configured to detect a gas inside a cooking chamber of a cooking apparatus;
    a communication device configured to communicate with an external apparatus; and
    a controller configured to:
    determine at least one of a type of the gas and a concentration of the gas detected by the gas sensor based on a change in a resonant frequency of a component of the gas sensor, determine a cooking progress state of an ingredient in the cooking chamber of the cooking apparatus based on the determined at least one of the type of the gas and the concentration of the gas detected by the gas sensor, and transmit information on the determined cooking progress state to the external apparatus through the communication device to inform a user of the cooking progress state.

11. The gas detection apparatus of claim 10, wherein the controller determines a type of the ingredient based on the determined type and the determined concentration of the gas detected by the gas sensor.

12. The gas detection apparatus of claim 11, wherein the controller determines at least one of a cooking mode, a cooking time, and a cooking temperature according to the determined type of the ingredient.

* * * * *